(12) United States Patent
Moriyama et al.

(10) Patent No.: US 11,516,024 B2
(45) Date of Patent: Nov. 29, 2022

(54) SEMICONDUCTOR DEVICE, UPDATE DATA-PROVIDING METHOD, UPDATE DATA-RECEIVING METHOD, AND PROGRAM

(71) Applicants: RENESAS ELECTRONICS CORPORATION, Tokyo (JP); MITSUBISHI ELECTRIC CORPORATION, Tokyo (JP)

(72) Inventors: Daisuke Moriyama, Tokyo (JP); Daisuke Suzuki, Tokyo (JP)

(73) Assignees: RENESAS ELECTRONICS CORPORATION, Tokyo (JP); MITSUBISHI ELECTRIC CORPORATION, Tokyo (JP)

( * ) Notice: Subject to any disclaimer, the term of this patent is extended or adjusted under 35 U.S.C. 154(b) by 136 days.

(21) Appl. No.: 16/955,435

(22) PCT Filed: Jan. 19, 2018

(86) PCT No.: PCT/JP2018/001521
§ 371 (c)(1),
(2) Date: Jun. 18, 2020

(87) PCT Pub. No.: WO2019/142307
PCT Pub. Date: Jul. 25, 2019

(65) Prior Publication Data
US 2020/0351108 A1 Nov. 5, 2020

(51) Int. Cl.
*H04L 9/32* (2006.01)
*G06F 21/79* (2013.01)
(Continued)

(52) U.S. Cl.
CPC ............ *H04L 9/3271* (2013.01); *G06F 21/79* (2013.01); *H04L 9/0816* (2013.01);
(Continued)

(58) Field of Classification Search
CPC ... H04L 9/3271; H04L 9/0825; H04L 9/0869; H04L 9/0891; H04L 9/0861;
(Continued)

(56) References Cited

U.S. PATENT DOCUMENTS

2003/0126440 A1 7/2003 Go et al.
2009/0193521 A1 7/2009 Matsushima et al.
(Continued)

FOREIGN PATENT DOCUMENTS

JP 2003-150453 A 5/2003
JP 2012-093921 A 5/2012
(Continued)

OTHER PUBLICATIONS

Extended European Search Report issued in corresponding European Patent Application No. 18900856.8-1218, dated Jul. 16, 2021.
(Continued)

*Primary Examiner* — Kristine L Kincaid
*Assistant Examiner* — Alexander R Lapian
(74) *Attorney, Agent, or Firm* — McDermott Will & Emery LLP

(57) ABSTRACT

A semiconductor device includes a memory, a random number generation circuit, and a control circuit. The memory stores key information, and the random number generation circuit generates first and second random number signals. The control circuit generates sixth and seventh random number signals from the first random number signal and the key information, generates encrypted update data from update data using the seventh random number signal, transmits the first and second random number signals as request signals to an external terminal device, receives, from the external device, first and second response signals as response signals in response to the request signals, generates an eighth random number signal using the first response (Continued)

signal, the second and the sixth random number signals as input signals, and provides the encrypted update data for the external terminal device when the second response signal coincides with the eighth random number signal.

20 Claims, 21 Drawing Sheets

(51) Int. Cl.
  *H04L 9/08* (2006.01)
  *H04L 9/40* (2022.01)
(52) U.S. Cl.
  CPC .......... *H04L 9/0825* (2013.01); *H04L 9/0861* (2013.01); *H04L 9/0869* (2013.01); *H04L 9/0891* (2013.01); *H04L 63/0435* (2013.01)
(58) Field of Classification Search
  CPC . H04L 9/0816; H04L 9/0662; H04L 63/0435; G06F 21/79; G06F 21/57
  See application file for complete search history.

(56) References Cited

U.S. PATENT DOCUMENTS

| | | | |
|---|---|---|---|
| 2011/0271344 A1 | 11/2011 | Unagami et al. | |
| 2012/0324557 A1* | 12/2012 | Rubin | G06F 21/50 726/7 |
| 2015/0074420 A1* | 3/2015 | Sone | G06F 8/65 713/187 |
| 2016/0036814 A1 | 2/2016 | Conrad et al. | |
| 2016/0267273 A1 | 9/2016 | Sugawara | |
| 2016/0378457 A1 | 12/2016 | Adachi et al. | |
| 2017/0019399 A1* | 1/2017 | Yamazaki | G06F 21/554 726/23 |
| 2017/0222815 A1 | 8/2017 | Meriac et al. | |
| 2017/0310475 A1* | 10/2017 | Hu | H04L 9/0891 713/171 |
| 2018/0145991 A1* | 5/2018 | McCauley | H04L 9/0891 |

FOREIGN PATENT DOCUMENTS

| | | |
|---|---|---|
| JP | 2014-182571 A | 9/2014 |
| JP | 2015-103163 A | 6/2015 |
| JP | 2017-022654 A | 1/2017 |
| WO | 2006/129654 A1 | 12/2006 |
| WO | 2015/068220 A1 | 5/2015 |
| WO | 2016/020640 A1 | 2/2016 |

OTHER PUBLICATIONS

International Search Report issued in corresponding International Patent Application No. PCT/JP2018/001521, dated Apr. 24, 2018, with English translation.

* cited by examiner

SEMICONDUCTOR DEVICE, UPDATE DATA-PROVIDING METHOD, UPDATE DATA-RECEIVING METHOD, AND PROGRAM

CROSS REFERENCE TO RELATED APPLICATIONS

This application is the U.S. National Phase under 35 U.S.C. § 371 of International Application No. PCT/JP2018/001521, filed on Jan. 19, 2018, the entire contents of each are hereby incorporated by reference.

TECHNICAL FIELD

The present disclosure relates to a semiconductor device, an update data providing method, an update data receiving method, and a program.

BACKGROUND ART

Internet of Things (IoT) devices have become widespread. It has thus been expected that firmware will be updated in semiconductor devices such as microcomputers included in these IoT devices in a state in which a high level of security is ensured.

An exterior device disclosed in Patent Literature 1 stores update data including an update control program, and a program that implements means for calculating a digest value relating to the update control program, means for determining whether an operation after the update is normal, and means for transmitting a result of the determination as a response. Then the control apparatus receives update data transmitted from the exterior device via a relay device. Further, the control apparatus updates the control program by the update control program included in the received update data, executes the program and determines whether the operation after the update is normal, and sends back the result of the determination to the relay device.

An electronic device disclosed in Patent Literature 2 includes an application file pertaining to an operation of application software and updates the application file via a network. This electronic device stores the application file formed of one or more data pieces, and receives update data and location information that indicates a location updated by the update data in the application file from an external apparatus via the network. Further, the electronic device rewrites data that exists in the location indicated by the location information into the update data, updates only a part of the application file, and checks if the updated application file has been tampered with.

A program rewrite system disclosed in Patent Literature 3 retrieves difference data between a new program and an old program in a multi-protocol-compatible in-vehicle relay device, transmits the difference data in the new program to the ECU, and stores this difference data.

An embedded apparatus disclosed in Patent Literature 4 sequentially performs a verification process for each of sections in which update data for updating software is divided into a plurality of parts. The embedded apparatus stores an intermediate value obtained during the verification process. The embedded apparatus compares, after completion of the verification process performed on all the sections, a value obtained in the verification process with verification data and confirms that data is not tampered with. After it is confirmed that the data is not tampered with, the embedded apparatus sequentially performs the verification process again on each of the sections. The embedded apparatus compares the intermediate value obtained in the verification process with the intermediate value stored previously. When the obtained intermediate value and the intermediate value stored previously coincide with each other, the software is updated.

CITATION LIST

Patent Literature

[Patent Literature 1] Japanese Unexamined Patent Application Publication No. 2015-103163
[Patent Literature 2] International Patent Publication No. WO 2006/129654
[Patent Literature 3] Japanese Unexamined Patent Application Publication No. 2014-182571
[Patent Literature 4] International Patent Publication No. WO 2015/068220

SUMMARY OF INVENTION

Technical Problem

In the technique disclosed in Patent Literature 1, it is required for the relay device to be able to perform an electronic signature operation on update data. Further, since the update data is not encrypted in Patent Literature 1, confidentiality of the update data cannot be ensured. Further, while the technique disclosed in Patent Literature 2 performs partial verification, it does not perform thorough verification. Therefore, management of tampering detection is performed for each block, which may cause the amount of stored data to increase. Further, according to the technique disclosed in Patent Literature 3, the relay device needs to perform an electronic signature and a decryption operation of update data. Therefore, while it is necessary to disclose the contents of the update data to the relay device, security in the communication between the relay device and the ECU is not ensured. Further, the technique disclosed in Patent Literature 4 requires storage of intermediate values in the respective sections, which may cause the amount of stored data to increase. Further, since the verification process needs to be performed twice for each section, it may take time for the calculation. Further, none of the aforementioned Patent Literature proposes means for confirming that communication with a legitimate device to be updated is being performed.

The other problems and the novel characteristics will be made apparent from the description of the specification and the accompanying drawings.

Solution to Problem

According to one embodiment, a semiconductor device includes a memory, a random number generation circuit, and a control circuit, and provides update data for an external terminal device. The memory stores key information, and the random number generation circuit generates a first random number signal and a second random number signal. The control circuit generates a sixth random number signal and a seventh random number signal from the first random number signal and the key information, and generates encrypted update data from the update data using a seventh random number signal. The control circuit generates the first random number signal and the second random number signal as request signals to be transmitted to the external terminal device, and receives a first response signal and a second response signal from the external terminal device as response signals in response to the request signals. The control circuit generates an eighth random number signal using the first response signal, the second random number signal, and the sixth random number signal as input signals, and provides the encrypted update data for the external terminal device when the second response signal coincides with the eighth random number signal.

According to one embodiment, a semiconductor device includes a memory and a control circuit, and receives encrypted update data from an external server device. The memory stores pre-update data and key information. The control circuit receives, from the external server device, a first random number signal and a second random number signal as request signals, and generates a sixth random number signal and a seventh random number signal from the first random number signal and the key information. The control circuit generates a ninth random number signal and a tenth random number signal using the second random number signal and the sixth random number signal as input signals. Further, the control circuit generates a challenge code including a predetermined signal and outputs the ninth random number signal and the challenge code to the external server device as response signals in response to the request signals. The control circuit receives, from the external server device, an authentication signal and the encrypted update data based on the output response signal, and performs decryption processing of the encrypted update data when the received authentication signal coincides with the tenth random number signal.

Advantageous Effects of Invention

According to the embodiment, the semiconductor device is able to send and receive the update program efficiently and safely and perform update of the program.

DESCRIPTION OF EMBODIMENTS

Figure 1:
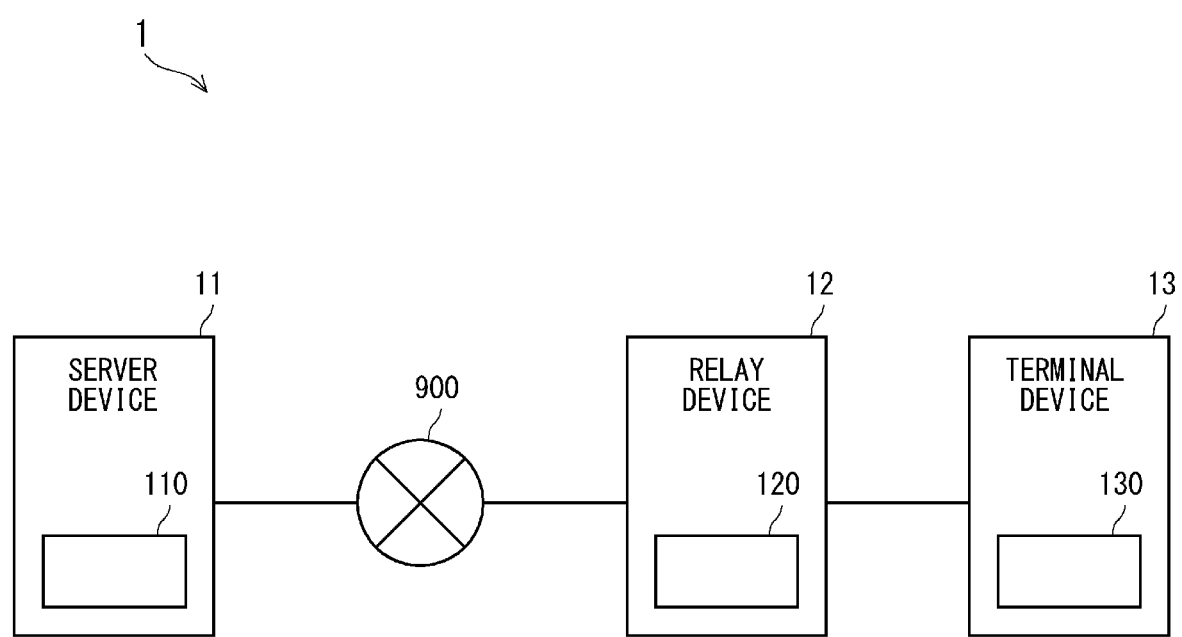
FIG. 1 is a schematic diagram of a transmission/reception system according to a first embodiment.

For clarity of explanation, the following descriptions and drawings will be appropriately omitted and simplified. Further, the respective components described in the drawings as functional blocks which perform various processing can be configured by CPUs (Central Processing Units), memories or other circuits in terms of hardware, and are realized by programs loaded in memories, or the like in terms of software. Accordingly, it will be understood by those skilled in the art that these functional blocks can be realized in various forms by only hardware, only software or combination thereof. They are not limited to any of them. Accordingly, in the following description, a configuration exemplified as a circuit can be achieved by either hardware or software or both thereof. A configuration shown as a circuit to achieve a certain function can also be represented as a part of software to achieve a similar function. For example, a configuration described as a control circuit can be described as a control unit. Incidentally, in the respective drawings, the same components are denoted by the same reference numerals, and dual description will be omitted as needed.

Further, the above-described programs are stored using various types of non-transitory computer readable media and can be supplied to a computer. The non-transitory computer readable media include various types of substantial recording media. Examples of the non-transitory computer readable media include a magnetic recording medium (e.g., flexible disk, magnetic tape, hard disk drive), an optical magnetic recording medium (e.g., optical magnetic disk), a CD-ROM (Read Only Memory) CD-R, a CD-R/W, and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable media. Examples of the transitory computer readable media include an electric signal, an optical signal, and an electromagnetic wave. The transitory computer readable media are capable of supplying programs to the computer through a wired communication path such as an electric wire and an optical fiber or the like, or a wireless communication path.

First Embodiment

Referring first to FIG. 1, an outline of a first embodiment will be described. FIG. 1 is a schematic diagram of a transmission/reception system according to the first embodiment. A transmission/reception system 1 is a system for updating pre-update data that a terminal device 13 includes to update data that a server device 11 includes. The transmission/reception system 1 encrypts the update data in the server device 11 and transmits the encrypted update data, which is the update data that has been encrypted, to the terminal device 13. The terminal device 13 decrypts the encrypted update data and updates data. The transmission/reception system 1 includes the server device 11, a relay device 12, and the terminal device 13. The server device 11 and the relay device 12 are connected to each other in such a way that they can communicate with each other. Further, the relay device 12 and the terminal device 13 are connected to each other in such a way that they can communicate with each other. In the illustration of FIG. 1, the server device 11 and the relay device 12 are connected to each other in such a way that they can communicate with each other via a network 900. Note that it does not matter whether the connection means enabling the respective configurations is wired one or wireless one, or whether or not it uses the Internet.

The server device 11, which is, for example, a personal computer or a blade server, includes a first semiconductor device 110 that performs information processing. The relay device 12, which is, for example, a smartphone or a tablet terminal, includes a second semiconductor device 120 that performs information processing. Further, the terminal device 13 is a device called IoT device that is available for Internet connection or another device that has a communication function. The terminal device 13 includes a third semiconductor device 130 that performs information processing.

Figure 2:
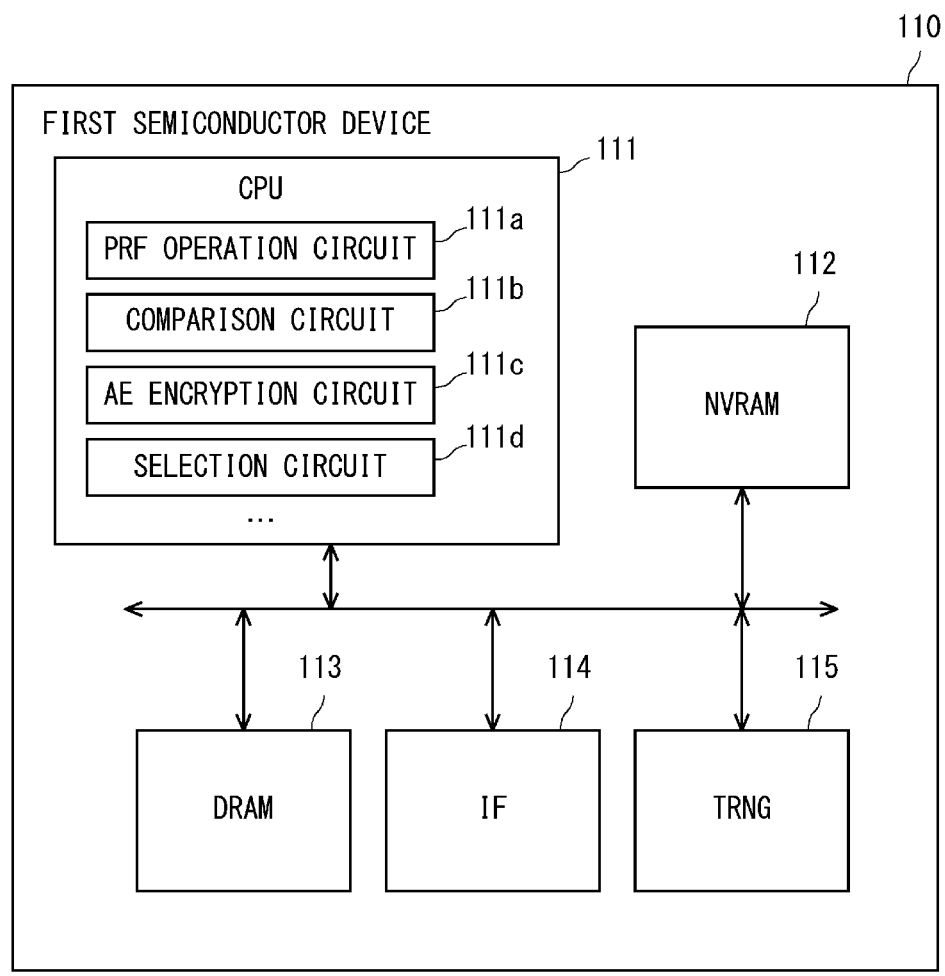
FIG. 2 is a hardware configuration diagram of a first semiconductor device according to the first embodiment.

FIG. 2 is a hardware configuration diagram of the first semiconductor device 110 according to the first embodiment. The first semiconductor device 110 that performs information processing mainly includes a CPU 111, an NVRAM 112 (Non-Volatile Random Access Memory), a DRAM 113 (Dynamic Random Access Memory), an IF 114 (Interface), and a TRNG 115 (True Random Number Generator: true random number generation circuit), and these components are connected to one another via a communication bus.

In the following description, unless otherwise specified, components shown by one name but different reference symbols have similar functions. Therefore, descriptions of these components will be omitted.

The CPU 111 is an operational device for performing operational processing and the like described later in the first semiconductor device 110. The CPU 111 mainly includes a PRF operation circuit 111a, a comparison circuit 111b, an AE encryption circuit 111c, and a selection circuit 111d. Note that the CPU 111 may include a plurality of these components as hardware or may be configured in such a way that parallel processing may be performed as software. Further, the CPU described in this embodiment may include peripheral circuits other than a CPU core.

The PRF operation circuit 111a calculates a desired input signal by a predetermined pseudorandom function (PRF) and outputs the result of the calculation. The pseudorandom function, which is a value that cannot be identified as a random number in terms of cryptography and is a function that sends back an output that seems to be sufficiently random in terms of intuition, indicates the one in which there is no polynomial time algorithm that identifies them between the pseudorandom function and a true random function. Further, the PRF operation circuit 111a outputs the same result for the same input. The PRF operation circuit 111a may specify the number of output variables as an input. Note that the PRF operation circuit 111a may be the one that uses a common key code or another function such as a function that is based on a hash function as long as the PRF operation circuit 111a outputs the aforementioned result as described above and safety can be ensured.

The comparison circuit 111b receives two signals as inputs, compares the received two signals, and outputs the result of the comparison indicating whether these signals coincide with each other. As an example of the output signal indicating the result of the comparison, the output signal is "0" when the two signals do no coincide with each other and the output signal is "1" when the two signals coincide with each other. However, the output signal indicating the result of the comparison is not limited thereto.

The AE encryption circuit 111c (AE=Authenticated Encryption) performs authenticated encryption processing on input signals using a desired plaintext and key information as input signals. The key information is used also when decryption processing is performed. The AE encryption circuit 111c outputs a ciphertext, an authentication tag, and a header signal by performing authenticated encryption processing.

The selection circuit 111d includes a function of outputting one of the plurality of input signals that has been selected. The selection circuit 111d selects one of the plurality of input signals to be output depending on the value of the comparison result signal SG20 supplied from the comparison circuit 111b. That is, the comparison result signal SG20 is a selection control signal of the selection circuit 111d. The selection circuit 111d is a multiplexer, as an example of a hardware configuration.

The NVRAM 112 is, for example, a non-volatile storage device such as a flash memory into which data can be written or from which data can be read out. The NVRAM 112 stores, for example, update data or key information for securing communication security.

The DRAM 113, which is a volatile storage device, temporarily stores various kinds of data. The hardware configuration of the DRAM 113 according to this embodiment is merely one example, and the DRAM 113 may be formed of a Static Random Access Memory (SRAM), or may be formed of a non-volatile memory such as a Magnetoresistive Random Access Memory (MRAM) or a flash memory in place of the volatile memory.

The TRNG 115 is a true random number generation circuit. The TRNG 115 uses random physical phenomena such as, for example, detection, by a sensor, of noise or thermal noise generated by the diode or radioactive rays due to decay of radioactive material, and generates random numbers based on this signal. The CPU 111 processes signals of the respective components and transmits signals in accordance with the processing to the relay device 12 via the IF 114. Alternatively, the CPU 111 receives the signal received from the relay device 12 via the IF 114 and processes the received signal.

Figure 3:
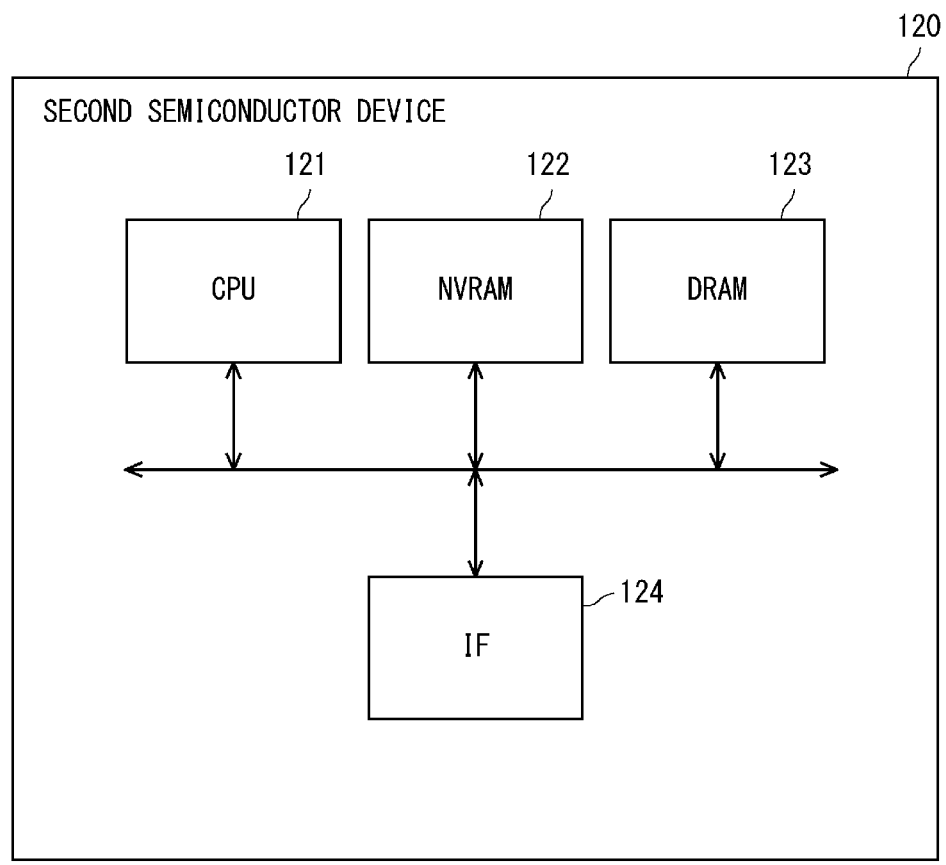
FIG. 3 is a hardware configuration diagram of a second semiconductor device according to the first embodiment.

FIG. 3 is a hardware configuration diagram of the second semiconductor device 120 according to the first embodiment. The second semiconductor device 120 that performs information processing mainly includes a CPU 121, an NVRAM 122, a DRAM 123, and an IF 124, and these components are connected by a communication bus. According to these configurations, the second semiconductor device 120 communicates with the server device 11, receives a signal from the server device 11, processes the received signal as necessary, and transmits the resulting signal to the terminal device 13. Further, the relay device 12 receives a signal from the terminal device 13, processes the received signal as necessary, and transmits the resulting signal to the server device 11.

Figure 4:
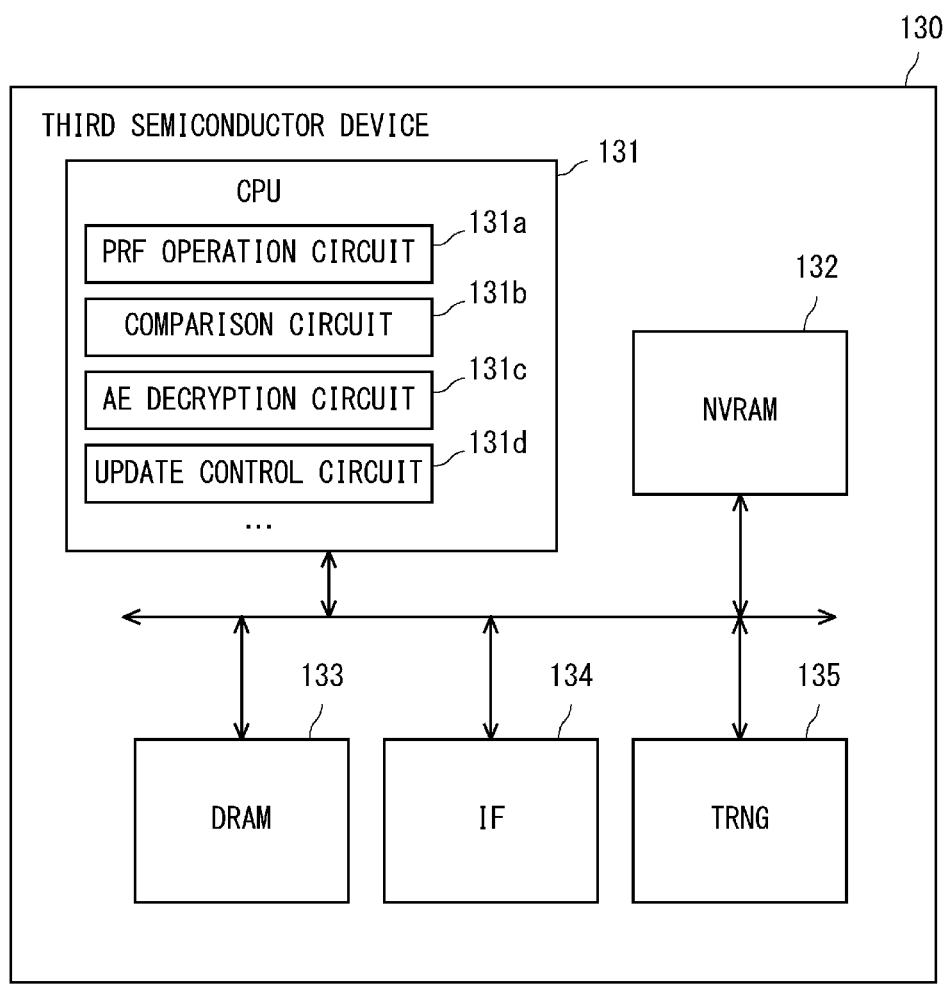
FIG. 4 is a hardware configuration diagram of a third semiconductor device according to the first embodiment.

FIG. 4 is a hardware configuration diagram of the third semiconductor device 130 according to the first embodiment. The third semiconductor device 130 that performs information processing mainly includes a CPU 131, an NVRAM 132, a DRAM 133, an IF 134, and a TRNG 135, and these components are connected to one another by a communication bus. The terminal device 13 receives a signal from the relay device 12 and processes the received signal. Further, the terminal device 13 transmits the processed signal to the relay device 12.

The CPU 131 is an operational device for performing operational processing and the like in the third semiconductor device 130. The CPU 131 mainly includes a PRF operation circuit 131a, a comparison circuit 131b, and an AE decryption circuit 131c.

The AE decryption circuit 131c performs decryption processing and verification of an authentication tag on an encrypted signal with authentication. That is, the AE decryption circuit 131c uses a ciphertext, an authentication tag, and a header signal that the AE encryption circuit 111c has output, and key information used by the AE encryption circuit 111c as input signals. The AE decryption circuit 131c decrypts the ciphertext and verifies whether the authentication tag generated as a result of the decryption coincides with the authentication tag received as the input signal. When these authentication tags coincide with each other as a result of the verification, the AE decryption circuit 131c outputs the decrypted plaintext. On the other hand, when these authentication tags do not coincide with each other, the AE decryption circuit 131c outputs a signal indicating non-coincidence of the results of the authentication.

An update control circuit 131d performs signal control for updating the firmware. The update control circuit 131d receives a flag signal and an update data signal as input signals. When the received flag signal is a value for executing update of the firmware, the update control circuit 131d executes processing of replacing the update data received as the input signal by the pre-update data. Further, the update control circuit 131d may include a function of outputting a result indicating whether the firmware update processing has been successfully performed.

As will be described later as a modified example of the first embodiment, the terminal device 13 may not include the TRNG 135.

Figure 5:
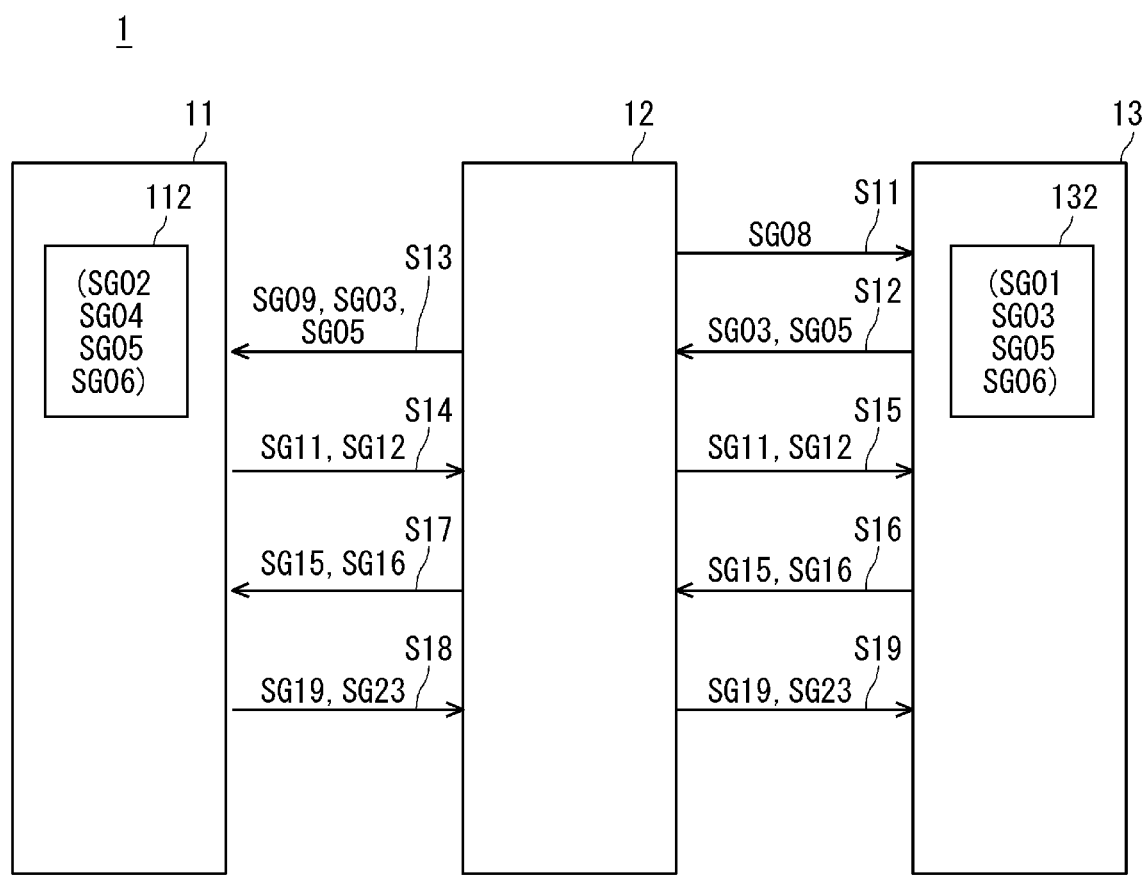
FIG. 5 is a diagram showing transmission/reception signals of the transmission/reception system according to the first embodiment.

Referring next to FIGS. 5 to 10, the details of an operation of the transmission/reception system 1 will be described. First, with reference to FIG. 5, signals that the respective devices in the transmission/reception system 1 include and signals transmitted or received by the respective devices will be described. FIG. 5 is a diagram showing transmission/reception signals of the transmission/reception system 1 according to the first embodiment.

The server device 11 stores update data SG02, update version data SG04, identifier SG05, and a master key SG06 in the NVRAM 112. The update data SG02 is, for example, firmware of a new version for the terminal device 13. The update version data SG04 is data including version information of the update data SG02. The identifier SG05, which is identification information uniquely given to the terminal device 13, is, for example, a Mac address (Media Access Control address) or a product-specific identification number of the terminal device 13.

The terminal device 13 stores pre-update data SG01, pre-update version data SG03, an identifier SG05, and a master key SG06 in the NVRAM 132. The pre-update data SG01 is, for example, firmware that the terminal device 13 is currently using. The pre-update version data SG03 is data including version information of the pre-update data SG01.

In the following, signals transmitted or received by the respective devices according to the transmission/reception system 1 and processing that the respective devices perform will be described along a flow of processing of the signals. In the example shown here, the transmission/reception system 1 performs version update processing of the firmware of the terminal device 13.

First, the relay device 12 transmits a version check request signal SG08 to the terminal device 13 (Step S11). The version check request signal SG08 is a signal for requesting the terminal device 13 to send the version of the firmware as a response.

Upon receiving the version check request signal SG08 from the relay device 12, the terminal device 13 transmits the pre-update version data SG03, which is the current version of the firmware of the terminal device 13, and the identifier SG05 to the relay device 12 in response to the received request signal (Step S12).

Upon receiving the pre-update version data SG03 and the identifier SG05 from the terminal device 13, the relay device 12 adds a version upgrade request signal SG09 to these pieces of data and transmits the obtained signals to the server device 11 (Step S13).

Figure 6:
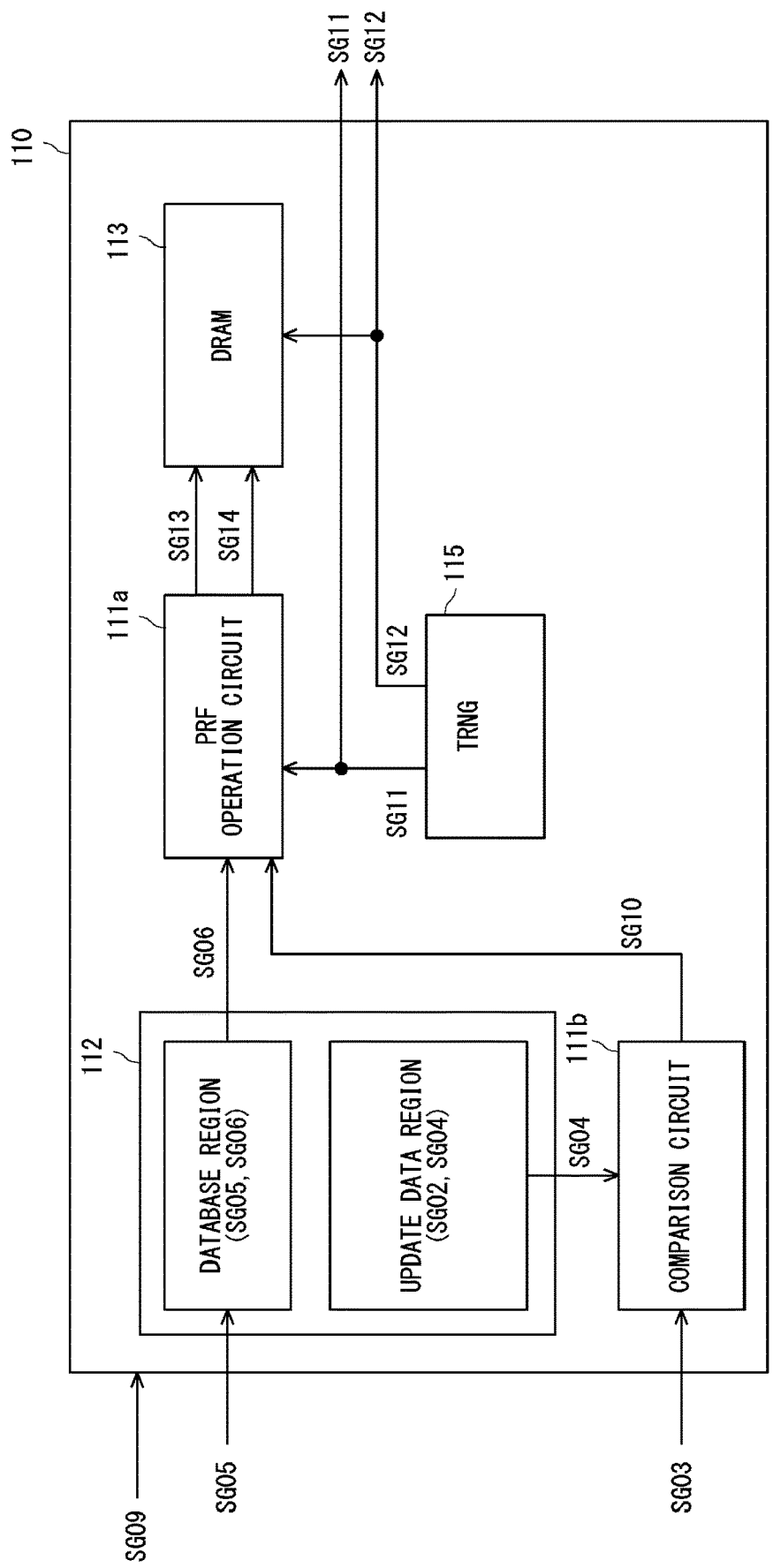
FIG. 6 is a functional block diagram of a first semiconductor device 110 according to the first embodiment.

With reference to FIG. 6, processing from a time when the server device 11 processes the signals that it has received from the relay device 12 to a time when it outputs the request signal will be described. In FIG. 6, the first semiconductor device 110 that the server device 11 includes determines whether to perform the above processing on the terminal device 13 in order to perform firmware version update processing. When performing this processing, the first semiconductor device 110 outputs a signal for generating a key that is used when the encrypted update data is decrypted and a challenge code for authenticating the terminal device 13.

FIG. 6 is a functional block diagram of the first semiconductor device 110 in the server device 11 according to the first embodiment. In FIG. 6, the first semiconductor device 110 accepts the version upgrade request signal SG09 from the relay device 12. Next, the first semiconductor device 110 accesses the database region of the NVRAM 112 to determine whether the identifier SG05 that the NVRAM 112 stores matches the identifier SG05 received from the relay device 12.

When these signals regarding the identifier coincide with each other, the server device 11 compares the pre-update version data SG03, which is the firmware version of the terminal device 13 received from the relay device 12, with the update version data SG04 stored in the NVRAM 112. That is, the first semiconductor device 110 accesses the update data region of the NVRAM 112 and transmits the update version data SG04 to the comparison circuit 111b of the CPU 111. Further, the first semiconductor device 110 supplies the pre-update version data SG03 received from the relay device 12 to the comparison circuit 111b. Then the comparison circuit 111b compares these data pieces and outputs a comparison result signal SG10 to the PRF operation circuit 111a.

In this example, when the version data items coincide with each other as a result of the comparison of data by the comparison circuit 111b, the comparison circuit 111b outputs "0" as the comparison result signal SG10. In this case, the firmware of the terminal device 13 is the latest one and needs not to be updated. Therefore, the PRF operation circuit 111a does not execute processing for updating the firmware. On the other hand, when the version data pieces do not coincide with each other as the result of the comparison, the comparison circuit 111b outputs "1" as the comparison result signal SG10. In this case, the server device 11 executes processing for updating the firmware of the terminal device 13 that will be described later.

When the PRF operation circuit 111a has received "1" from the comparison circuit 111b as the comparison result signal SG10, the PRF operation circuit 111a accesses the database region of the NVRAM 112 and receives the master key SG06. Further, the PRF operation circuit 111a receives a first random number signal SG11 from the TRNG 115. The PRF operation circuit 111a receives the master key SG06 and the first random number signal SG11, generates a sixth random number signal SG13 and a seventh random number signal SG14, and causes the DRAM 113 to store these generated signals.

The TRNG 115 supplies the first random number signal SG11 to the PRF operation circuit 111a, generates a second random number signal SG12, and causes the DRAM 113 to store the generated second random number signal SG12. The TRNG 115 outputs the generated first random number signal SG11 as information for generating a key for allowing the terminal device 13 to decrypt the update data. Further, the TRNG 115 outputs the generated second random number signal SG12 as a challenge code, which is a request signal for the terminal device 13.

Referring is made once again to FIG. 5. The server device 11 transmits, to the relay device 12, the first random number signal SG11 and the second random number signal SG12 that the TRNG 115 have output (Step S14).

The relay device 12 transmits the first random number signal SG11 and the second random number signal SG12 received from the server device 11 to the terminal device 13 (Step S15).

Figure 7:
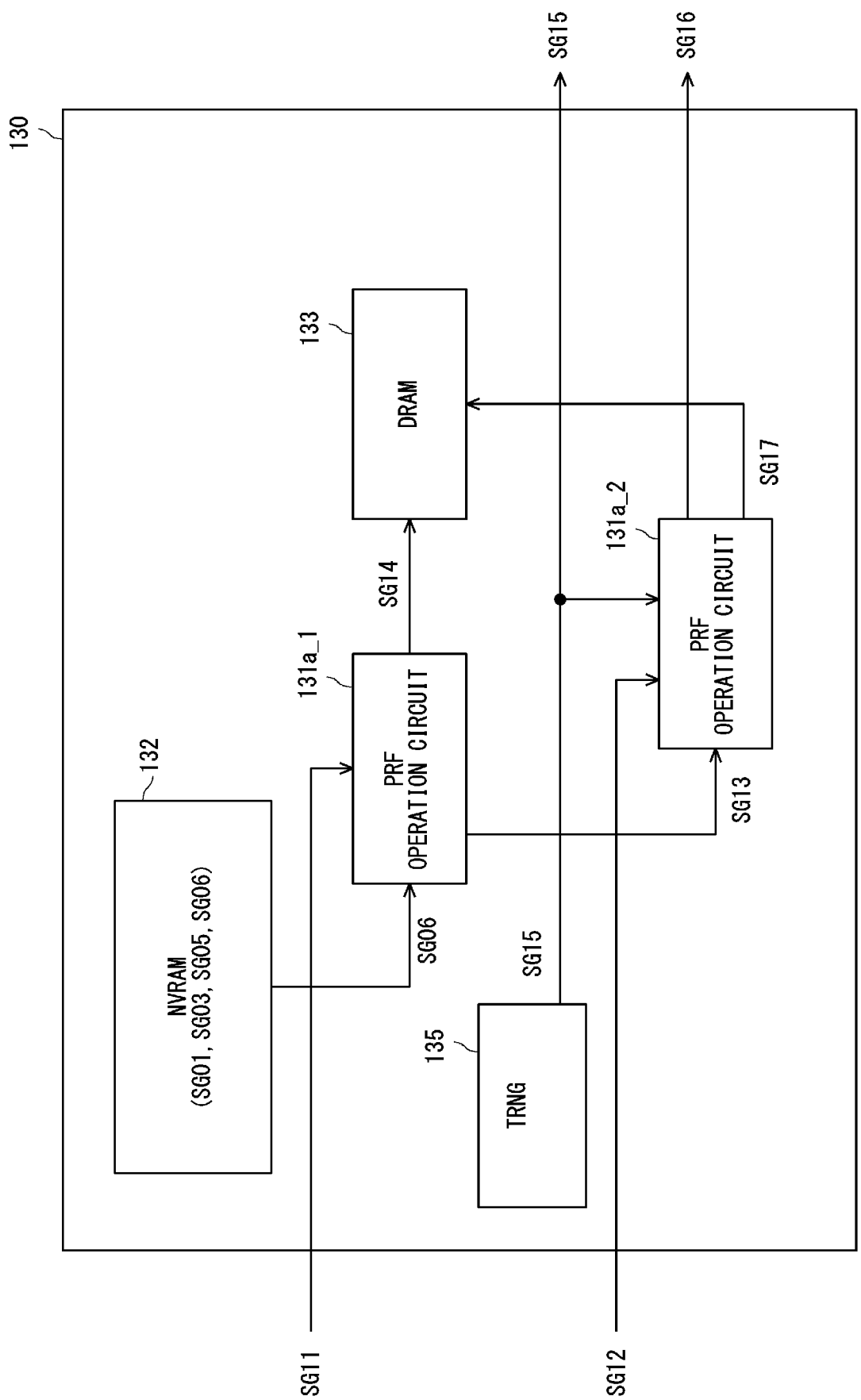
FIG. 7 is a functional block diagram of a third semiconductor device according to the first embodiment.

With reference to FIG. 7, an outline of the processing performed by the terminal device 13 that has received the first random number signal SG11 and the second random number signal SG12 will be described. In FIG. 7, the third semiconductor device 130 included in the terminal device 13 generates a key (the seventh random number signal SG14) that is used when decrypting the encrypted update data using the signal (the first random number signal SG11) for generating the key received from the server device 11. Further, the third semiconductor device 130 outputs a response code (a ninth random number signal SG16) as a response signal in response to the challenge code (the second random number signal SG12) received from the server device 11. Further, the third semiconductor device 130 outputs, when it makes a response, a challenge code (a third random number signal SG15) for authenticating the server device 11.

FIG. 7 is a functional block diagram of the terminal device according to the first embodiment. Since two PRF operation circuits are provided in FIG. 7, one of them is referred to as a PRF operation circuit 131a_1 and another one of them is referred to as a PRF operation circuit 131a_2 for the sake of convenience of the description. As a matter of course, the PRF operation circuit 131a_1 and the PRF operation circuit 131a_2 may have configurations different from each other. Otherwise they may have one configuration but perform operations different from each other. Further, in the following description as well, in a case in which a plurality of components of the same type are present in one block diagram, the same reference symbols may be used.

The third semiconductor device 130 included in the terminal device 13 inputs the received first random number signal SG11 into the PRF operation circuit 131a included in the CPU 131. Further, the PRF operation circuit 131a reads out the master key SG06 stored in the NVRAM 132 as an input signal.

The PRF operation circuit 131a_1 receives the master key SG06 and the first random number signal SG11 and generates the sixth random number signal SG13 and the seventh random number signal SG14. The PRF operation circuit 131a_1 inputs the sixth random number signal SG13 of the generated signals into the PRF operation circuit 131a_2. Further, the PRF operation circuit 131a_1 causes the DRAM 133 to store the seventh random number signal SG14 of the generated signals.

The PRF operation circuit 131a_2 to which the sixth random number signal SG13 has been input further receives the second random number signal SG12 received from the relay device 12 as an input signal. Further, the PRF operation circuit 131a_2 receives the third random number signal SG15 from the TRNG 135 as another input signal.

The PRF operation circuit 131a_2 generates the ninth random number signal SG16 and a tenth random number signal SG17 using the sixth random number signal SG13, the second random number signal SG12, and the third random number signal SG15 as input signals. The PRF operation circuit 131a_2 outputs the ninth random number signal SG16 of these generated signals as a response signal in response to the request signal received from the server device 11. Further, the PRF operation circuit 131a_2 causes the DRAM 133 to store the tenth random number signal SG17 of these generated signals.

The TRNG 135 outputs the third random number signal SG15 generated as the input signal of the PRF operation circuit 131a_2 as a response signal in response to the request signal received from the server device 11. That is, the third semiconductor device 130 outputs the ninth random number signal SG16 and the third random number signal SG15 as response signals in response to the request signals received from the server device 11.

Referring is made once again to FIG. 5. The terminal device 13 transmits, to the relay device 12, the third random number signal SG15 and the ninth random number signal SG16 that the third semiconductor device 130 has output (Step S16).

The relay device 12 transmits the third random number signal SG15 and the ninth random number signal SG16 received from the server device 13 to the server device 11 (Step S17).

Figure 8:
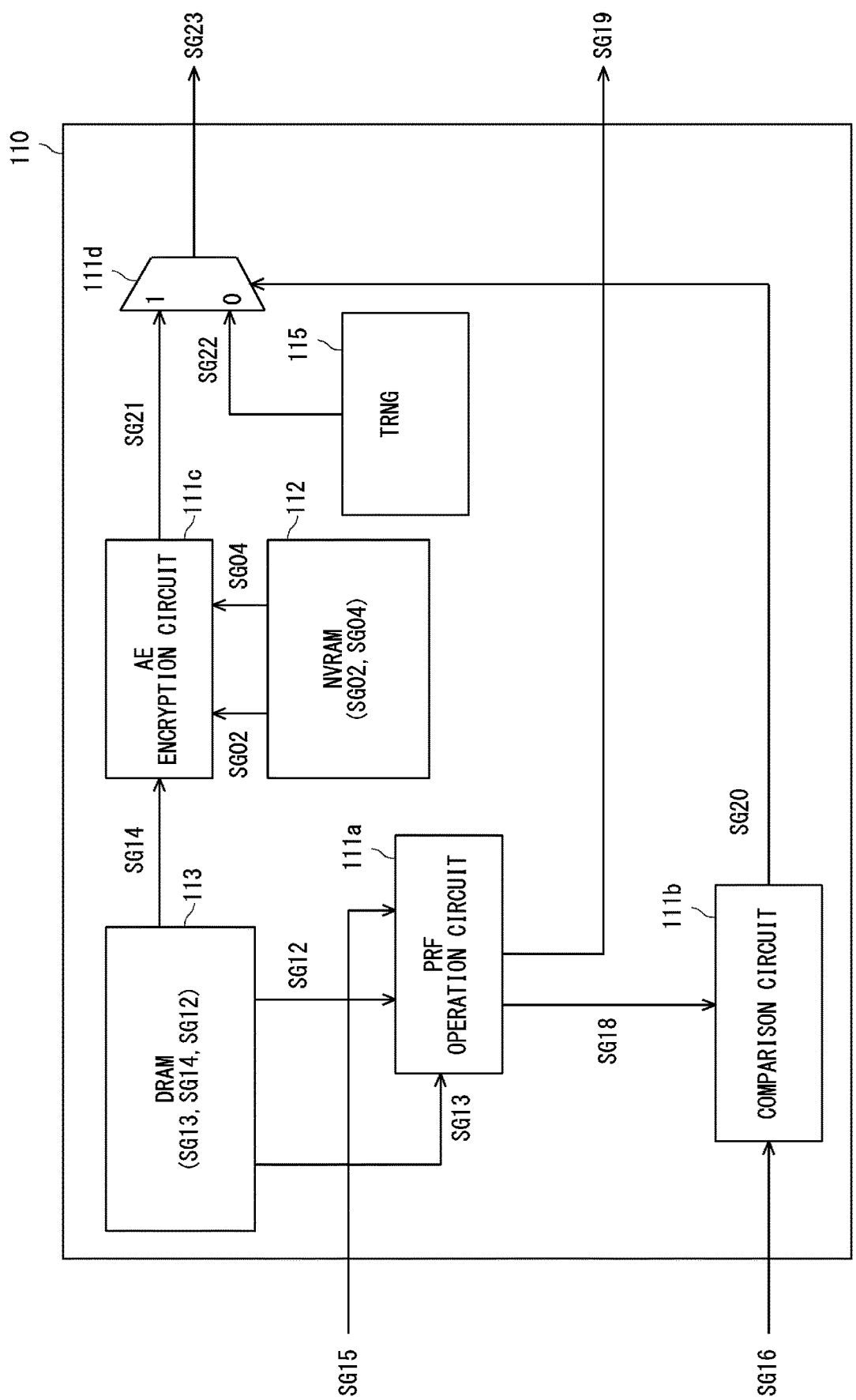
FIG. 8 is a functional block diagram of the first semiconductor device according to the first embodiment.

Referring to FIG. 8, processing performed by the server device 11 that has received the third random number signal SG15 and the ninth random number signal SG16 will be described. In FIG. 8, the first semiconductor device 110 included in the server device 11 outputs a response code (an eleventh random number signal SG19) as a response signal to the challenge code (the third random number signal SG15) received from the terminal device 13. Further, the first semiconductor device 110 compares the response code (the ninth random number signal SG16) received from the terminal device 13 with an expected value to determine whether they coincide with each other, and outputs a ciphertext SG23 in accordance with the result of the comparison.

FIG. 8 is a functional block diagram of the first semiconductor device according to the first embodiment. The first semiconductor device 110 inputs the received third random number signal SG15 into the PRF operation circuit 111a. The PRF operation circuit 111a further receives the sixth random number signal SG13 and the second random number signal SG12 from the DRAM 113 as input signals.

The PRF operation circuit 111a generates an eighth random number signal SG18 and an eleventh random number signal SG19 using the sixth random number signal SG13, the second random number signal SG12, and the third random number signal SG15 as input signals. The PRF operation circuit 111a transmits the generated eighth random number signal SG18 to the comparison circuit 111b. Further, the PRF operation circuit 111a outputs the generated eleventh random number signal SG19 as a response code in response to the challenge code received from the terminal device 13.

The first semiconductor device 110 inputs the received ninth random number signal SG16 into the comparison circuit 111b. The comparison circuit 111b receives, as input signals, the eighth random number signal SG18 output from the PRF operation circuit 111a and the ninth random number signal SG16 output from the terminal device 13, and compares these received signals. That is, the server device 11 compares the response code sent by the terminal device 13 in response to the challenge code transmitted from the server device 11 with the expected value to determine whether or not they coincide with each other. When these signals do not coincide with each other as a result of the comparison of the data by the comparison circuit 111b, the comparison circuit 111b outputs "0" as a comparison result signal SG20. On the other hand, when these signals coincide with each other as a result of the comparison, the comparison circuit 111b outputs "1" as the comparison result signal SG20. The comparison circuit 111b supplies the output comparison result signal SG20 to the selection circuit 111d.

The AE encryption circuit 111c receives the update data SG02 and the update version data SG04 from the NVRAM 112 as input signals. Further, the AE encryption circuit 111c receives the seventh random number signal SG14, which is key information for encrypting the update data SG02 and the update version data SG04, from the DRAM 113. The AE encryption circuit 111c outputs an encrypted update data SG21 based on these input signals and inputs the output encrypted update data SG21 into the selection circuit 111d.

The TRNG 115 generates a fourth random number signal SG22 and inputs the generated signal into the selection circuit 111d. The fourth random number signal SG22 output from the TRNG 115, which is a true random number, is set in such a way that the number of digits of the signal becomes the same as that of the encrypted update data SG21. That is, when decryption cannot be performed, it is not easy to distinguish the encrypted update data SG21 from the fourth random number signal SG22.

The selection circuit 111d receives the encrypted update data SG21 and the fourth random number signal SG22 described above as the input signals and receives the comparison result signal SG20 as the selection control signal. When the value of the comparison result signal SG20 is "1", the selection circuit 111d selects the encrypted update data SG21 as the ciphertext SG23, which is the output signal. On the other hand, when the value of the comparison result signal SG20 is "0", the selection circuit 111d selects the fourth random number signal SG22 in place of the encrypted update data SG21 as the ciphertext SG23, which is the output signal. The selection circuit 111d selects the signal as described above and outputs the selected signal as the ciphertext SG23.

As described above, when the authentication of the terminal device 13 has been correctly performed, the first semiconductor device 110 outputs the encrypted signal including the update data. On the other hand, when the authentication of the terminal device 13 has not been correctly performed, the first semiconductor device 110 transmits a random number signal that cannot be easily distinguished from the encrypted update data SG21 for the transmission destination that has not been correctly authenticated. As described above, by transmitting the signal that cannot be easily distinguished from a formally correct signal to a counterpart that is not correctly authenticated, it is possible to prevent unwanted attacks from third parties.

With the configuration shown in FIG. 8, the first semiconductor device 110 outputs the eleventh random number signal SG19 as a response code in response to the third random number signal SG15, which is the challenge code, and outputs the ciphertext SG23 in accordance with the ninth random number signal SG16, which is a response code received from the terminal device 13.

Referring is made once again to FIG. 5. The server device 11 transmits the eleventh random number signal SG19 and the ciphertext SG23 output from the first semiconductor device 110 to the relay device 12 (Step S18).

The relay device 12 transmits the eleventh random number signal SG19 and the ciphertext SG23 received from the server device 11 to the terminal device 13 (Step S19).

Figure 9:
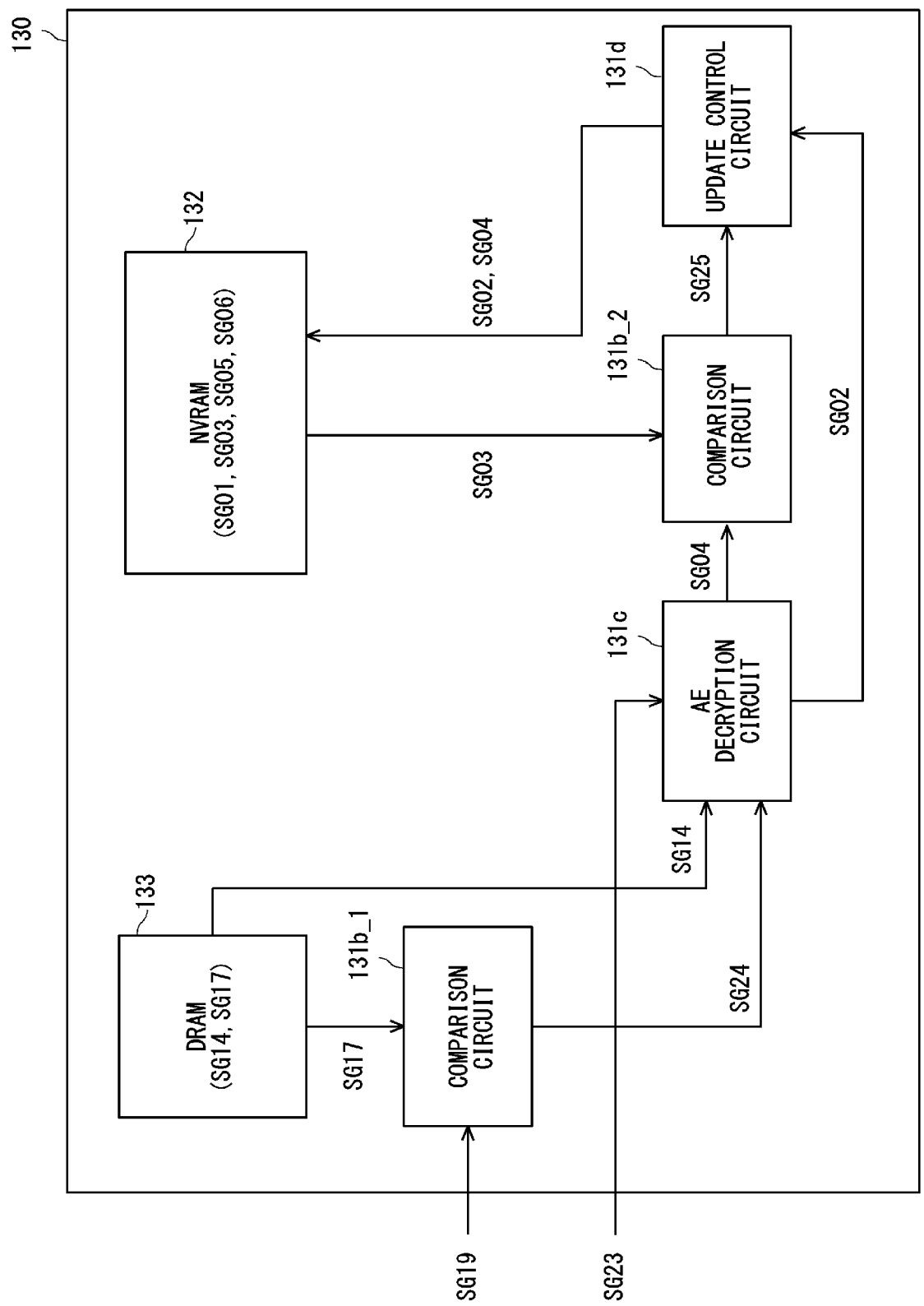
FIG. 9 is a functional block diagram of the third semiconductor device according to the first embodiment.

With reference to FIG. 9, processing performed by the terminal device 13 that has received the eleventh random number signal SG19 and the ciphertext SG23 will be described. In FIG. 9, the third semiconductor device 130 included in the terminal device 13 performs authentication on the server device 11 using the response code (the eleventh random number signal SG19) received from the server device 11. Further, the third semiconductor device 130 determines whether or not to decrypt the ciphertext SG23 received from the server device 11 in accordance with the result of the authentication performed on the server device 11, and performs processing in accordance with the result of the determination.

FIG. 9 is a functional block diagram of the third semiconductor device according to the first embodiment. In FIG. 9, the third semiconductor device 130 of the terminal device 13 inputs the eleventh random number signal SG19 received from the server device 11 and the tenth random number signal SG17 stored in the DRAM 133 into a comparison circuit 131b_1 to compare these signals. When these signals do not coincide with each other, the comparison circuit 131b_1 outputs "0" as a comparison result signal SG24. When these signals coincide with each other, the comparison circuit 131b_1 outputs "1" as the comparison result signal SG24 and supplies the output signal to the AE decryption circuit 131c.

Further, the third semiconductor device 130 inputs the ciphertext SG23 received from the server device 11 into the AE encryption circuit 131c. The AE encryption circuit 131c further receives the seventh random number signal SG14 stored in the DRAM 133 as an input signal.

When the value of the comparison result signal SG24 is "0", this means that the authentication of the server device 11 has not been correctly performed. In this case, the AE decryption circuit 131c does not execute processing of decryption the ciphertext SG23. On the other hand, when the value of the comparison result signal SG24 is "1", this means that the authentication of the server device 11 has been correctly performed. In this case, the AE decryption circuit 131c executes the following processing of decryption the ciphertext SG23.

As described above, by not executing the processing of decryption the ciphertext received when the authentication has not been correctly performed, it is possible to prevent an update request from a malicious third party or the like.

The AE decryption circuit 131c decrypts the ciphertext SG23 using the ciphertext SG23 and the seventh random number signal SG14, which is key information for decrypting the ciphertext SG23, as input signals. After the ciphertext SG23 is decrypted, the AE decryption circuit 131c supplies the update version data SG04 included in the output signal to a comparison circuit 131b_2. The comparison circuit 131b_2 receives the pre-update version data SG03, which is information on the current version of the firmware stored in the third semiconductor device 130, from the NVRAM 132. The comparison circuit 131b_2 compares the update version data SG04 with the pre-update version data SG03 to determine whether the update version data SG04 is larger than the pre-update version data SG03, and supplies a comparison result signal SG25 to the update control circuit 131d.

The update control circuit 131d receives the comparison result signal SG25 from the comparison circuit 131b_2 and receives the decrypted update data SG02 from the AE decryption circuit 131c. The update control circuit 131d performs processing of updating the firmware stored in the NVRAM 132 when the version of the firmware that has been decrypted is larger than the version of the firmware stored in the NVRAM 132. As the processing of updating the firmware, the update control circuit 131d causes the NVRAM 132 to store the update data SG02 in place of the pre-update data SG01 and causes the NVRAM 132 to store the update version data SG04 in place of the pre-update version data SG03.

The transmission/reception system according to the first embodiment includes the aforementioned configuration. From the aforementioned description, the processing of the transmission/reception system 1 can be summarized as follows. That is, the transmission/reception system 1 that includes the server device and the terminal device that receives the update data from the server device executes the processing as follows.

First, the server device 11 transmits the signal (111) for generating a key for decrypting an authenticated cipher and a challenge code (112) for authenticating the terminal device 13 to the terminal device 13.

The terminal device 13 transmits the response code with respect to the challenge code (112) and the challenge code for authenticating the server device 11 to the server device 11.

The server device performs verification of the response code, transmits a cipher set in advance in accordance with the results of the verification, and transmits a response code in response to the challenge code received from the terminal device 13 to the terminal device 13.

The terminal device 13 performs verification of the response code received from the server device 11 and determines processing on the cipher received together with the response code in accordance with the result of the verification.

Further, in the transmission/reception system 1, the relay device 12 is provided between the server device 11 and the terminal device 13, the server device 11 and the relay device 12 communicate with each other, and the relay device 12 and the terminal device 13 communicate with each other.

The transmission/reception system 1 transmits/receives the update data using a common key that the server device 11 and the terminal device 13 include. Further, the transmission/reception system 1 operates the respective signals using a common pseudorandom function that the server device 11 and the terminal device 13 include. Therefore, the transmission/reception system 1 is able to maintain confidentiality of the update data and prevent information leakage to the third party.

The transmission/reception system 1 transmits or receives update data using the authenticated encryption technique. Therefore, if the update data that has been tampered with is supplied to the terminal device 13, the transmission/reception system 1 is able to prevent update with incorrect data by verifying the authentication tag.

Further, in the transmission/reception system 1, the relay device 12 is provided between the server device 11 and the terminal device 13. Accordingly, the transmission/reception system 1 allows signals to be transmitted and received between the server device 11 and the terminal device 13 even in a case in which the communication system of the server device 11 is different from the communication system of the terminal device 13. Therefore, even in a case in which, for example, the terminal device 13 is not directly connected to the Internet, the transmission/reception system 1 is able to update the firmware and to reduce the operational cost.

Further, in the transmission/reception system 1, each of the server device 11 and the terminal device 13 has a common key. According to this configuration, the transmission/reception system 1 is able to perform processing at a high speed. For example, the processing speed of the system according to this embodiment is about 100 times faster than that of the system that uses a typical public key.

<Modified Example of First Embodiment>

In the following description, with reference to FIG. 10, a modified example of the first embodiment will be described. The configuration of a terminal device 13 in a transmission/reception system 1 according to the modified example of the first embodiment is different from that described above in that the terminal device 13 according to this modified example does not include the TRNG 135.

Figure 10:
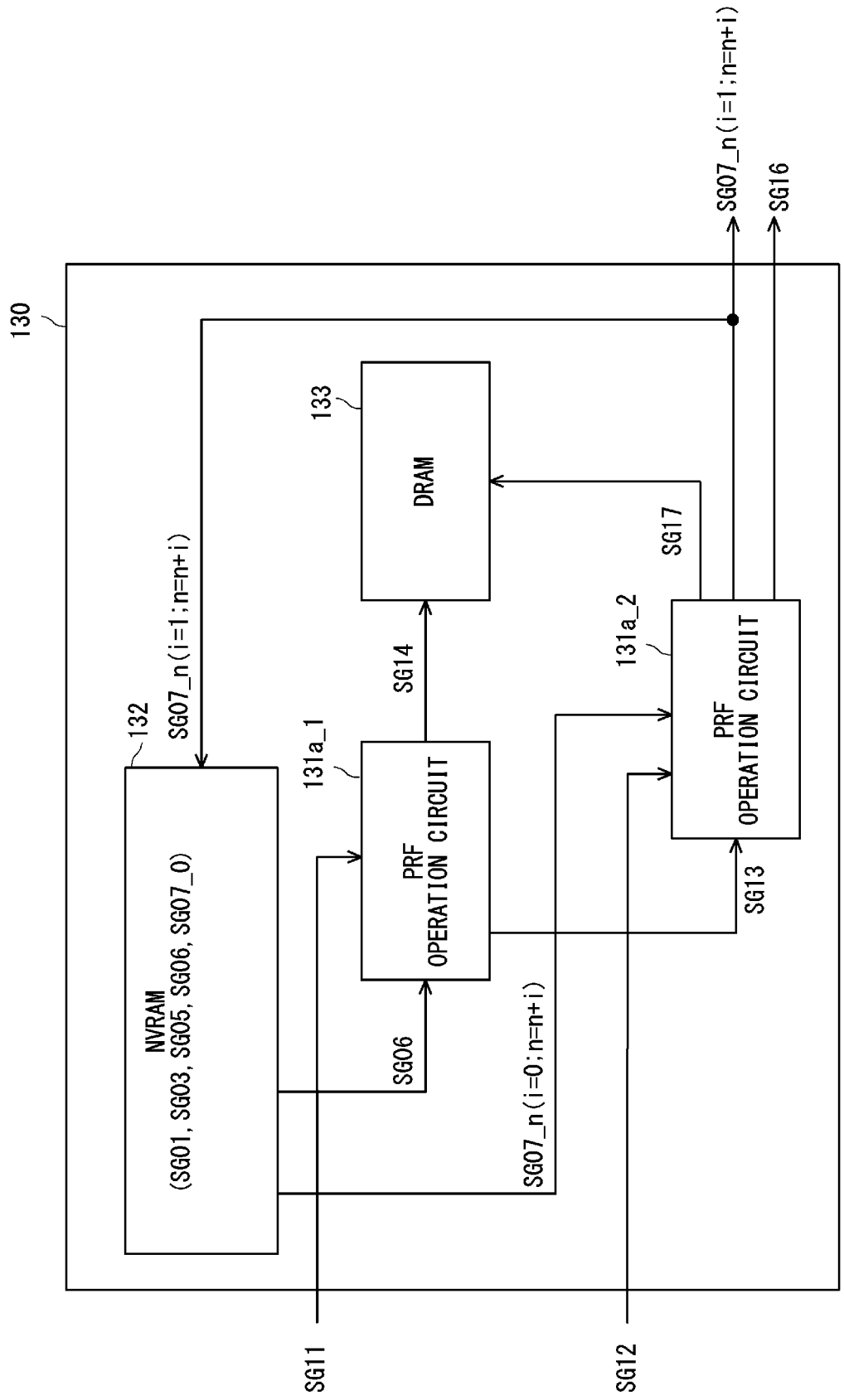
FIG. 10 is a functional block diagram of the third semiconductor device according to a modified example of the first embodiment.

FIG. 10 is a functional block diagram of the third semiconductor device according to the modified example of the first embodiment. The functional block diagram shown in FIG. 10 describes the processing performed by the terminal device 13 that has received the first random number signal SG11 and the second random number signal SG12 in Step S15 in FIG. 5, and corresponds to FIG. 7 according to the first embodiment.

FIG. 10 is a functional block diagram of the terminal device according to the first embodiment. With reference to FIG. 10, an outline of the processing performed by the terminal device 13 that has received the first random number signal SG11 and the second random number signal SG12 that is different from that in the aforementioned first embodiment will be described. In FIG. 10, in the third semiconductor device 130 included in the terminal device 13, the PRF operation circuit 131a_2 generates a twelfth random number signal SG07_n in place of the third random number signal SG15 as the challenge code for authenticating the server device 11. The third semiconductor device 130 causes the NVRAM 132 to store the twelfth random number signal SG07_n generated by the PRF operation circuit 131a_2. Further, the third semiconductor device 130 outputs the ninth random number signal SG16 as the response code and outputs the twelfth random number signal SG07_$n$ as the challenge code.

In the following description, the details of the twelfth random number signal SG07_$n$ will be described. In FIG. 10, the third semiconductor device 130 causes the NVRAM 132 to store a twelfth random number signal SG07_0, which is a random number, as the initial value of the twelfth random number signal SG07_$n$ in advance. When the third semiconductor device 130 performs processing first, the PRF operation circuit 131$a$ accesses the NVRAM 132 and receives the twelfth random number signal SG07_0. Further, the PRF operation circuit 131$a$_2 receives both the second random number signal SG12 and the sixth random number signal SG13 output from the PRF operation circuit 131$a$_1 as input signals. The PRF operation circuit 131$a$_2 performs an operation using them as the input signals and generates the ninth random number signal SG16, the tenth random number signal SG17, and a twelfth random number signal SG07_1 as output signals. The PRF operation circuit 131$a$_2 externally outputs the twelfth random number signal SG07_1 of these output signals as the challenge code for authenticating the server device 11 and causes the NVRAM 132 to store the twelfth random number signal SG07_1. The PRF operation circuit 131$a$_2 sequentially updates the twelfth random number signal SG07_$n$ with a new value every time it performs the operation, and stores the updated signal in the NVRAM 132.

Accordingly, the terminal device 13 is able to perform authentication of the server device 11 without having the TRNG 135. Therefore, the transmission/reception system 1 is able to make the configuration of the terminal device 13 simple. Accordingly, with this simple configuration, in the modified example of the first embodiment, the transmission/reception system 1 is able to send and receive the update program efficiently and safely and to update the program.

Note that the modified example of the first embodiment is not limited to the one described above. For example, as the challenge code, a numerical value that is incremented every time it is externally output may be used in place of the third random number signal SG15 or the twelfth random number signal SG07_$n$ described above. According to the above configuration, in the modified example of the first embodiment, by using the simple configuration, the transmission/reception system 1 is able to send and receive the update program efficiently and safely and update the program.

Second Embodiment

Referring next to FIGS. 11-16, an embodiment of the present disclosure will be described. The configuration of the CPU of the server device and the configuration of the CPU of the terminal device in a transmission/reception system 2 according to the second embodiment are different from those in the first embodiment. Further, the transmission/reception system 2 according to the second embodiment is different from the transmission/reception system 1 according to the first embodiment in that the transmission/reception system 2 manages the version of the firmware included in the terminal device in the server device.

Figure 11:
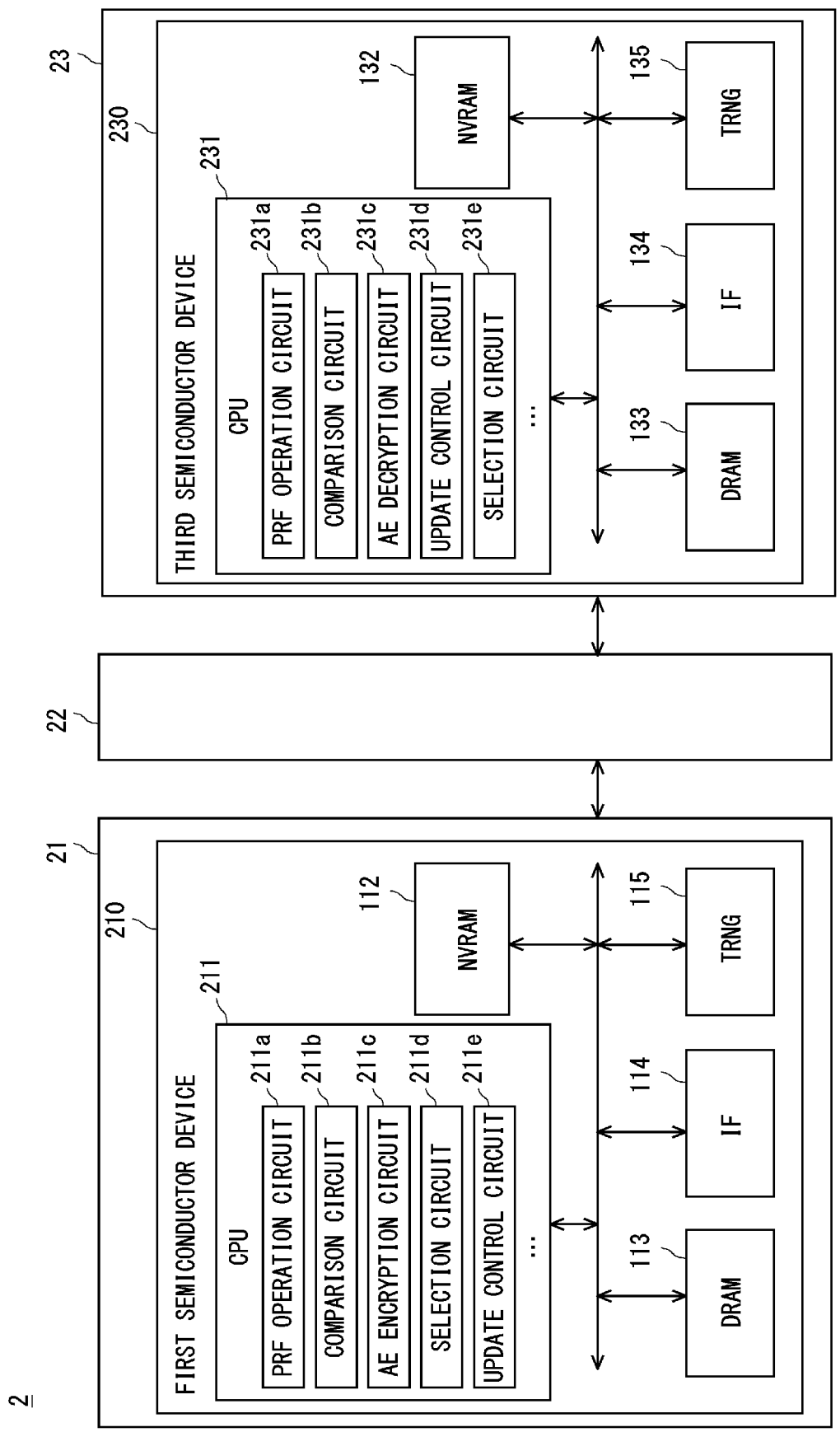
FIG. 11 is a hardware configuration diagram of a transmission/reception system according to a second embodiment.

FIG. 11 is a hardware configuration diagram of the transmission/reception system according to the second embodiment. The transmission/reception system 2 includes a server device 21, a relay device 22, and a terminal device 23. The server device 21 includes a first semiconductor device 210 and the first semiconductor device 210 includes a CPU 211. The CPU 211 is different from the CPU 111 according to the first embodiment in that the CPU 211 includes an update control circuit 211$e$. The terminal device 23 includes a third semiconductor device 230 and the third semiconductor device 230 includes a CPU 231. The CPU 231 is different from the CPU 131 according to the first embodiment in that the CPU 231 includes a selection circuit 231$e$.

Figure 12:
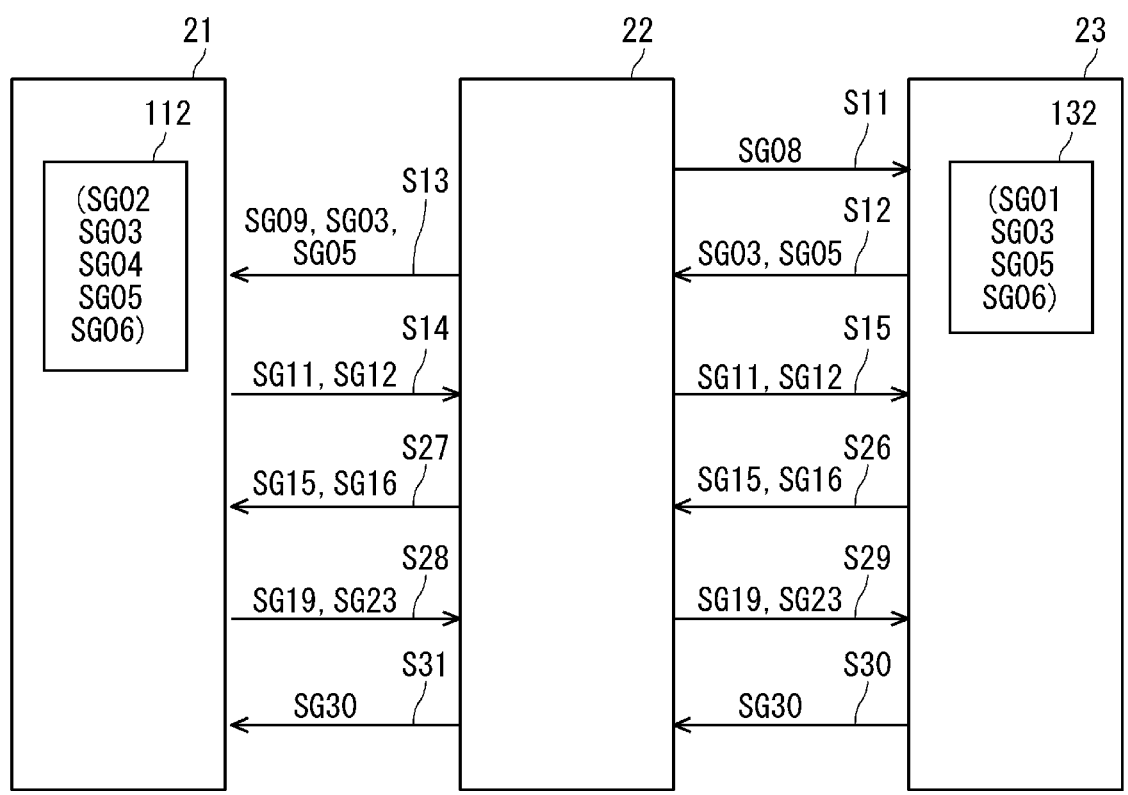
FIG. 12 is a diagram showing transmission/reception signals of the transmission/reception system according to the second embodiment.

Referring next to FIG. 12, signals that the respective devices in the transmission/reception system 2 include and signals transmitted or received by the respective devices will be described. FIG. 12 is a diagram showing transmission/reception signals of the transmission/reception system according to the second embodiment.

The server device 21 is different from the server device 11 according to the first embodiment in that the server device 21 stores the pre-update version data SG03 in the NVRAM 112. That is, the server device 21 manages the current version of the firmware of the terminal device 23. Note that the terminal device 23 stores signals similar to those stored in the terminal device 13 according to the first embodiment.

In the following, signals transmitted or received by the respective devices in the transmission/reception system 2 and processing that the respective devices perform that are different from those in the first embodiment will be described. As shown in FIG. 12, the processing from Steps S11 to S15 in the transmission/reception system 2 is similar to that in the first embodiment.

Figure 13:
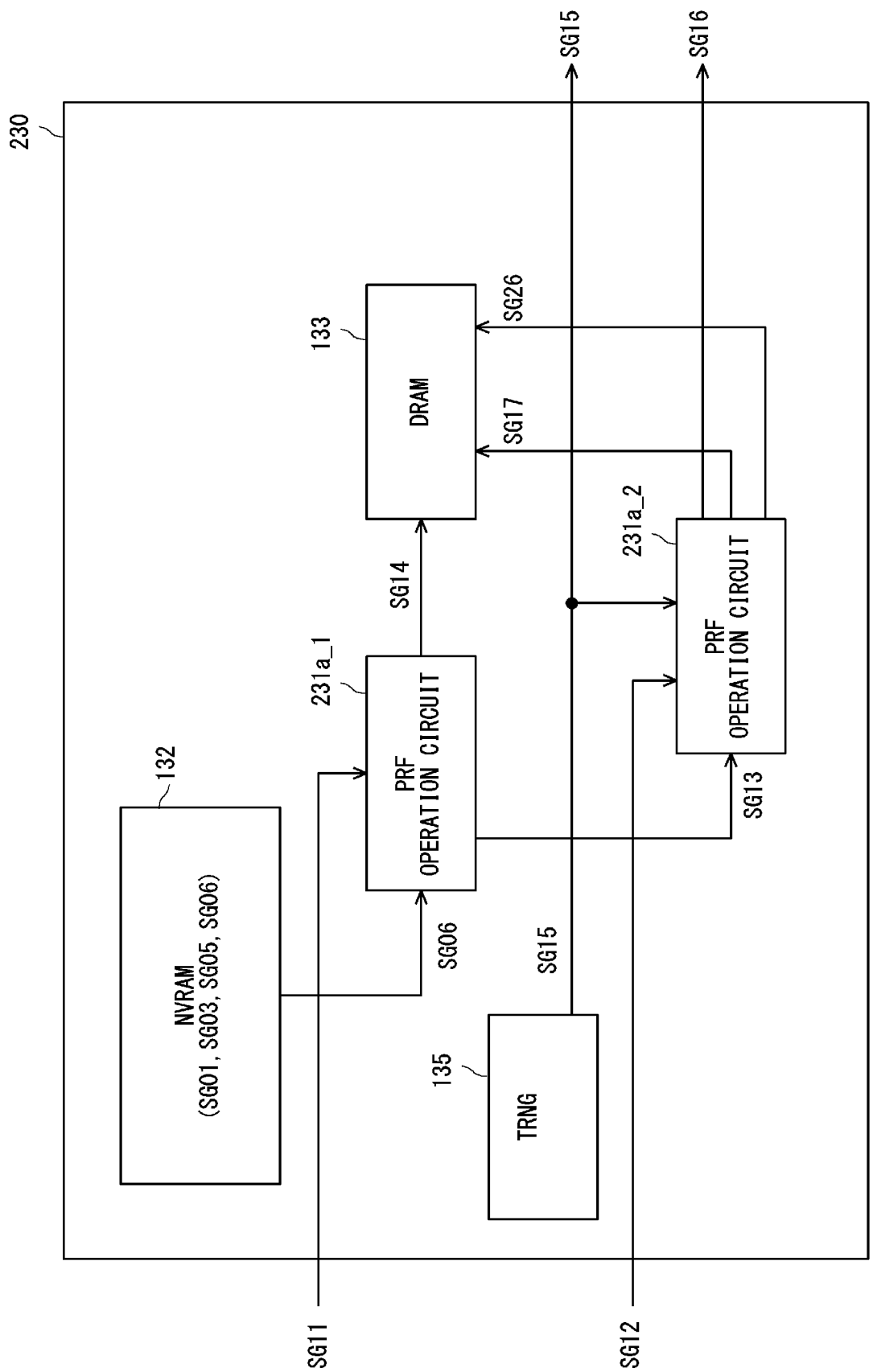
FIG. 13 is a functional block diagram of a third semiconductor device according to the second embodiment.

Referring next to FIG. 13, processing performed by the terminal device 23 that has received the first random number signal SG11 and the second random number signal SG12 that is different from that in the first embodiment shown in FIG. 7 will be described. In FIG. 13, the third semiconductor device 230 included in the terminal device 23 is different from that in the first embodiment in terms of the signal that a PRF operation circuit 231$a$_2 outputs. That is, in the operation performed using the sixth random number signal SG13, the second random number signal SG12, and the third random number signal SG15 as input signals, the PRF operation circuit 231$a$_2 outputs, besides the ninth random number signal SG16 and the tenth random number signal SG17, a thirteenth random number signal SG26. The thirteenth random number signal SG26 is used as a signal for indicating that the update of the firmware has been correctly performed. The PRF operation circuit 231$a$_2 causes the DRAM 133 to store the output thirteenth random number signal SG26. In FIG. 13, the third semiconductor device 230 that has executed the aforementioned processing outputs the third random number signal SG15 and the ninth random number signal SG16, like in the first embodiment.

Referring is made once again to FIG. 12. The terminal device 23 transmits the third random number signal SG15 and the ninth random number signal SG16 to the relay device 22 (Step S26) and the relay device 22 transmits these signals to the server device 21 (Step S27).

Figure 14:
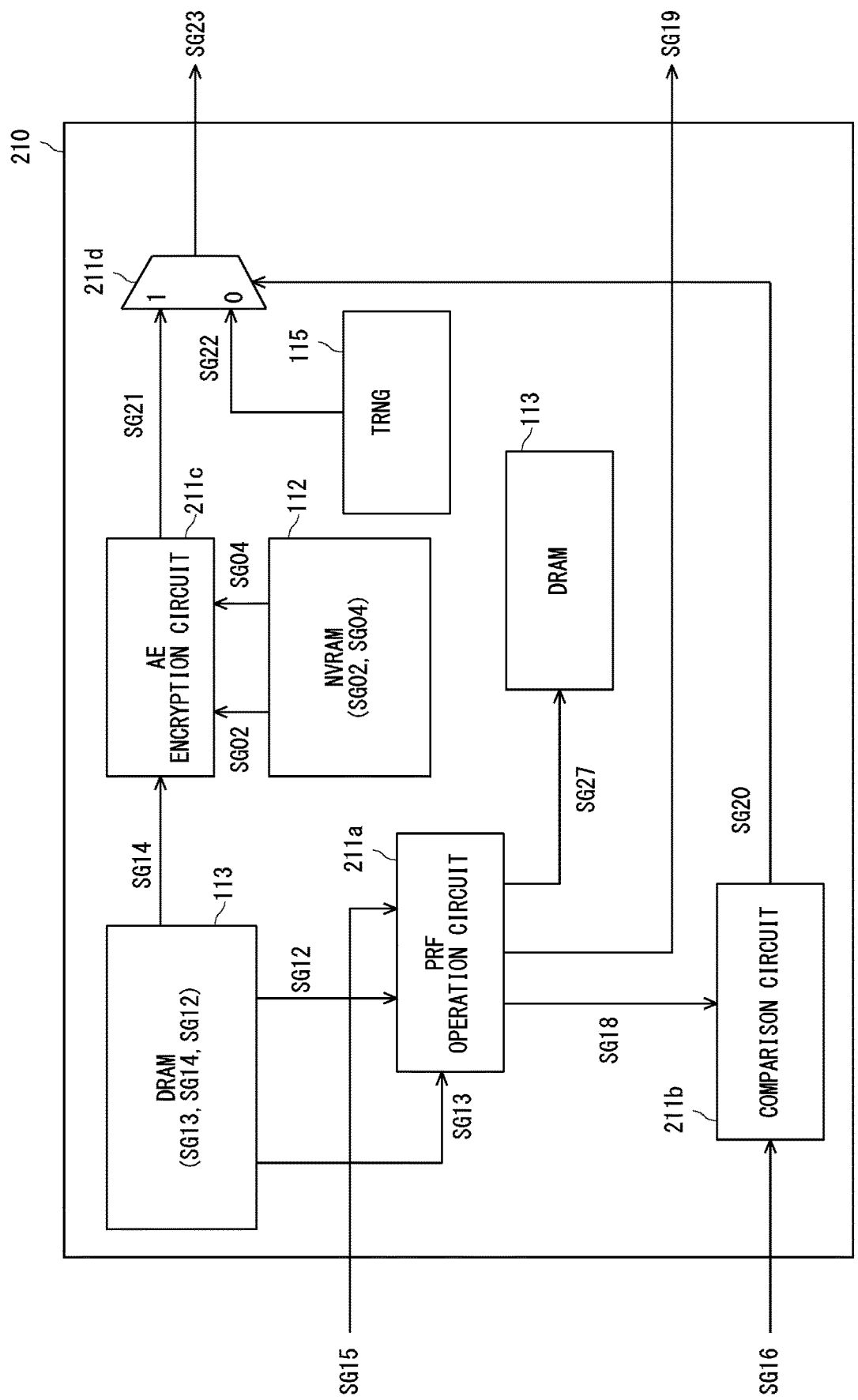
FIG. 14 is a functional block diagram of a first semiconductor device according to the second embodiment.

Referring next to FIG. 14, processing performed by the server device 21 that has received the third random number signal SG15 and the ninth random number signal SG16 that is different from that in the first embodiment shown in FIG. 8 will be described. FIG. 14 is a functional block diagram of the server device according to the second embodiment.

In FIG. 14, the first semiconductor device 210 included in the server device 21 is different from that in the first embodiment in terms of a signal output from the PRF operation circuit 211$a$. That is, in the operation performed using the second random number signal SG12, the sixth random number signal SG13, and the third random number signal SG15 as input signals, the PRF operation circuit 211$a$ outputs, besides the eighth random number signal SG18 and the eleventh random number signal SG19, a fourteenth random number signal SG27. The fourteenth random number signal SG27 is used as a signal for verifying the firmware update result signal received from the terminal device 23. The PRF operation circuit 211a causes the DRAM 113 to store the output fourteenth random number signal SG27. In FIG. 14, the first semiconductor device 210 that has executed the aforementioned processing outputs the eleventh random number signal SG19 and the ciphertext SG23, like in the first embodiment.

Referring is made once again to FIG. 12. The server device 21 transmits the eleventh random number signal SG19 and the ciphertext SG23 to the relay device 22 (Step S28) and the relay device 22 transmits these signals to the terminal device 23 (Step S29).

Figure 15:
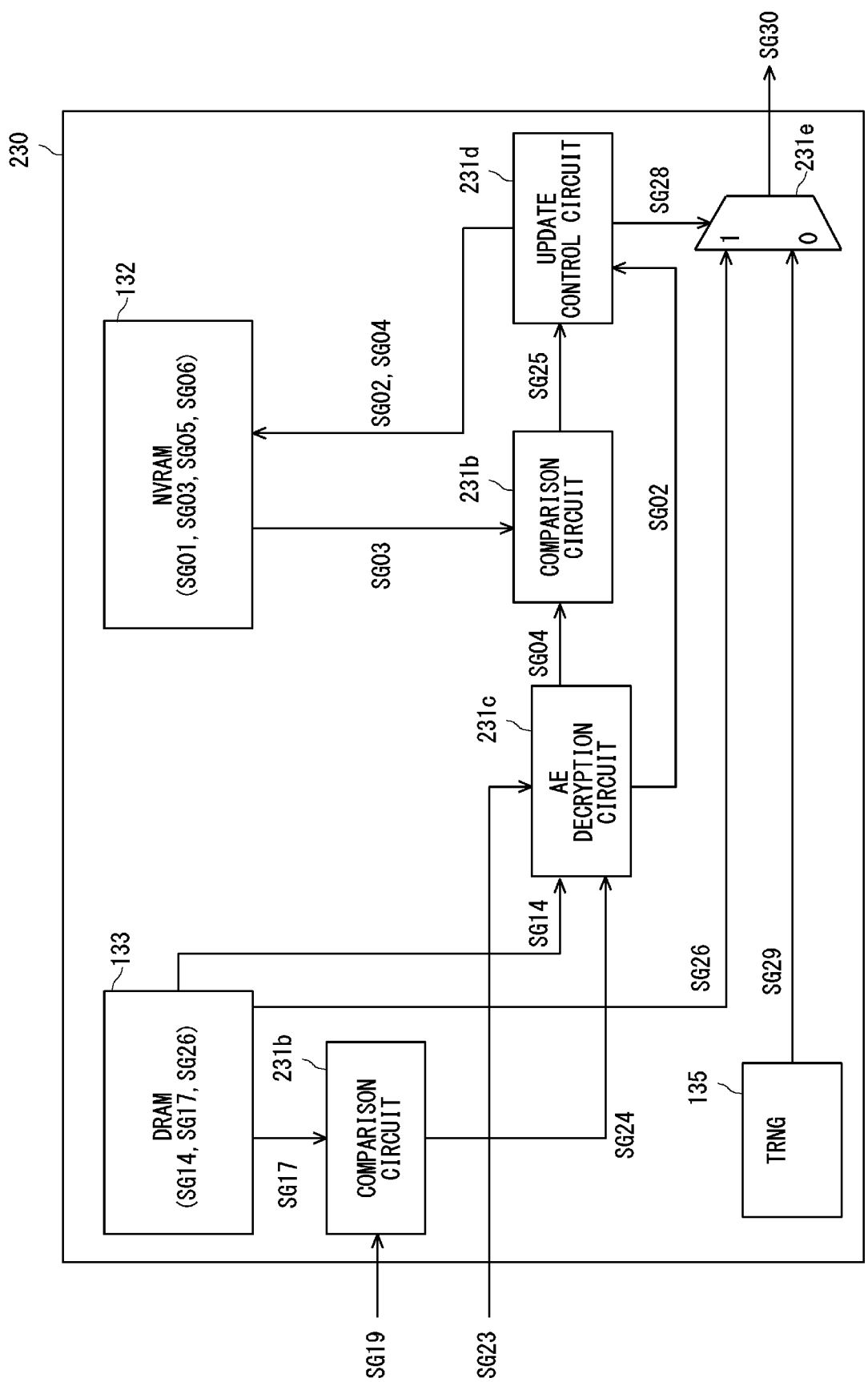
FIG. 15 is a functional block diagram of the third semiconductor device according to the second embodiment.

Referring next to FIG. 15, processing performed by the terminal device 23 that has received the eleventh random number signal SG19 and the ciphertext SG23 that is different from that in the first embodiment shown in FIG. 9 will be described. In FIG. 15, the third semiconductor device 230 included in the terminal device 23 is different from that in the first embodiment in that an update control circuit 231d outputs the result of the update and the third semiconductor device 230 transmits the update result signal to the server device 21 based on the result of the update output from the update control circuit 231d.

FIG. 15 is a functional block diagram of the terminal device according to the second embodiment. In FIG. 15, the update control circuit 231d receives the comparison result signal SG25 from a comparison circuit 231b and the update data SG02 decrypted by an AE decryption circuit 231c. The update control circuit 231d performs processing of updating the firmware stored in the NVRAM 132 when the version of the firmware that has been decrypted is larger than the version of the firmware stored in the NVRAM 132.

Upon completion of the processing of updating the firmware, the update control circuit 231d generates a first update result signal SG28 indicating whether the above processing has been successfully performed, and supplies the generated first update result signal SG28 to the selection circuit 231e as a selection control signal. When the processing of updating the firmware has been successfully performed, the update control circuit 231d outputs "1" as the first update result signal SG28. On the other hand, when the processing of updating the firmware has not been successfully performed, the update control circuit 231d outputs "0" as the first update result signal SG28.

The selection circuit 231e receives the thirteenth random number signal SG26 from the DRAM 133 and further receives a fifth random number signal SG29 from the TRNG 135 as input signals. The fifth random number signal SG29 is a true random number whose number of digits is the same as that of the thirteenth random number signal SG26. When the selection circuit 231e has received "1" from the update control circuit 231d as the first update result signal SG28, the selection circuit 231e selects the thirteenth random number signal SG26 as the signal to be output. On the other hand, when the selection circuit 231e has received "0" from the update control circuit 231d as the first update result signal SG28, the selection circuit 231e selects the fifth random number signal SG29 as the signal to be output. The selection circuit 231e outputs the selected signal as a second update result signal SG30. The third semiconductor device 230 outputs the second update result signal SG30 output from the selection circuit 231e.

Since the signals for indicating whether the processing of updating the firmware has been successfully performed are output as described above, these signals help to maintain confidentiality and prevent information leakage to third parties.

Referring is made once again to FIG. 12. The terminal device 23 transmits the second update result signal SG30 to the relay device 22 (Step S30) and the relay device 22 transmits it to the server device 21 (Step S31).

Figure 16:
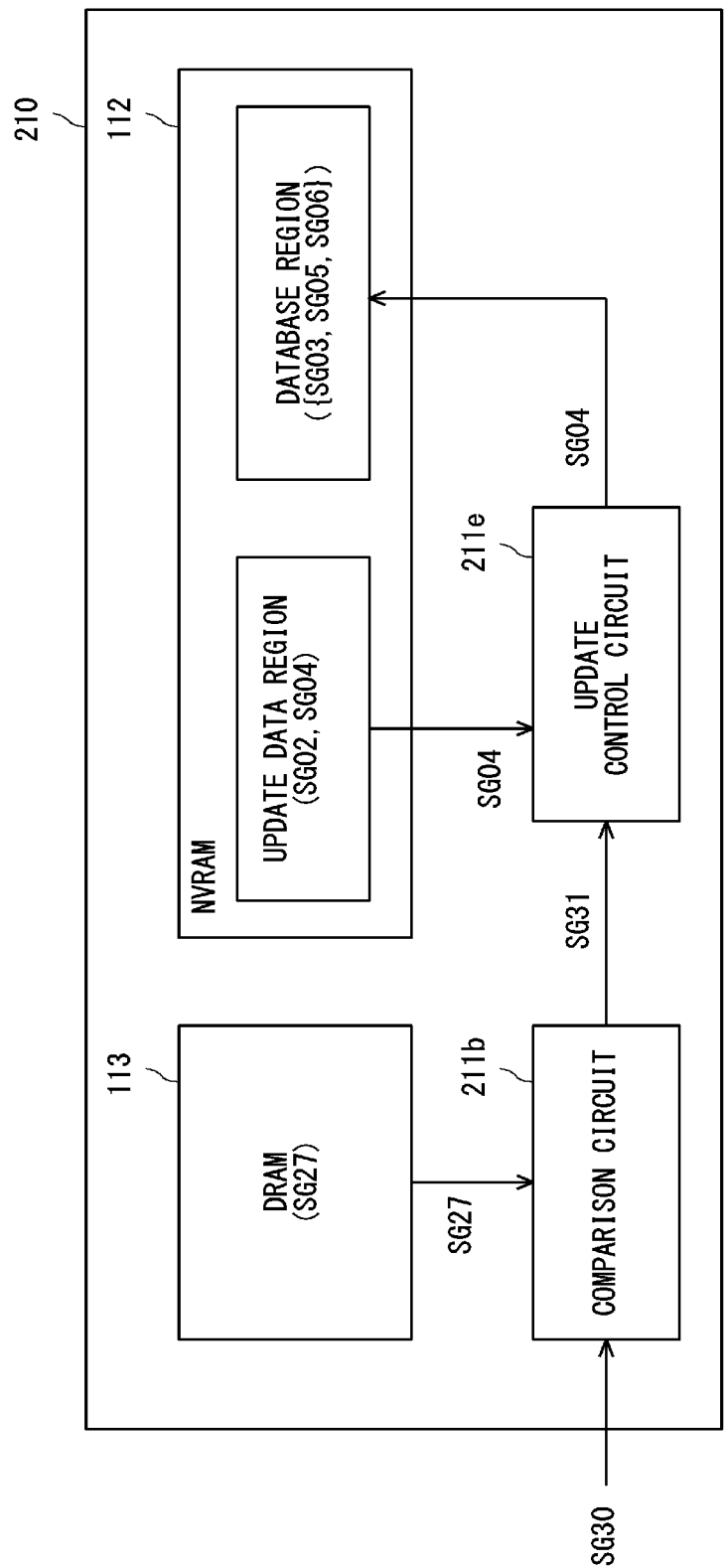
FIG. 16 is a functional block diagram of the first semiconductor device of the second embodiment.

Referring next to FIG. 16, processing performed by the server device 21 will be described. FIG. 16 is a functional block diagram of the server device according to the second embodiment. In FIG. 16, when the first semiconductor device 210 included in the server device 21 has received the second update result signal SG30, the first semiconductor device 210 supplies the received second update result signal SG30 to the comparison circuit 211b. Further, the comparison circuit 211b receives the fourteenth random number signal SG27 from the DRAM 113. That is, the comparison circuit 211b compares the second update result signal SG30 with the fourteenth random number signal SG27 and outputs a comparison result signal SG31 to the update control circuit 211e.

When the second update result signal SG30 coincides with the fourteenth random number signal SG27, the comparison circuit 211b outputs "1" as the comparison result signal SG31. On the other hand, when the second update result signal SG30 does not coincide with the fourteenth random number signal SG27, the comparison circuit 211b outputs "0" as the comparison result signal SG31.

When the update control circuit 211e has received "0" as the comparison result signal SG31, the update control circuit 211e does not execute processing of updating data in the NVRAM 112. In this case, it may be determined that the terminal device 23 has failed in the update processing and the comparison result signal SG31 may be stored in the NVRAM 112. On the other hand, when the update control circuit 211e has received "1" as the comparison result signal SG31, the update control circuit 211e executes processing of updating data in the NVRAM 112. That is, the update control circuit 211e accesses the update data region of the NVRAM 112 and receives the update version data SG04 in the update data transmitted to the terminal device 23. Then the update control circuit 211e performs processing of storing the update version data SG04 in place of the pre-update version data SG03 stored in the database region of the NVRAM 112.

According to the aforementioned configurations, the transmission/reception system according to the second embodiment is able to easily manage the update data of the terminal device. Accordingly, when, for example, the server device manages a plurality of terminal devices, it is possible to manage the update statuses of data that the respective terminal devices include and to know network vulnerability and the like.

Third Embodiment

Referring next to FIGS. 17 to 21, a third embodiment will be described. The communication processing between terminal devices in a transmission/reception system 3 according to the third embodiment is different from that in the first embodiment. That is, the transmission/reception system 3 according to the third embodiment first performs communication between a server device 31 and a relay device 32 and then performs communication between the relay device 32 and a terminal device 33 in a situation in which communication between the server device 31 and the relay device 32 is not performed. Further, the configuration of the relay device 32 in the transmission/reception system 3 according to the third embodiment is different from that in the first embodiment.

Figure 17:
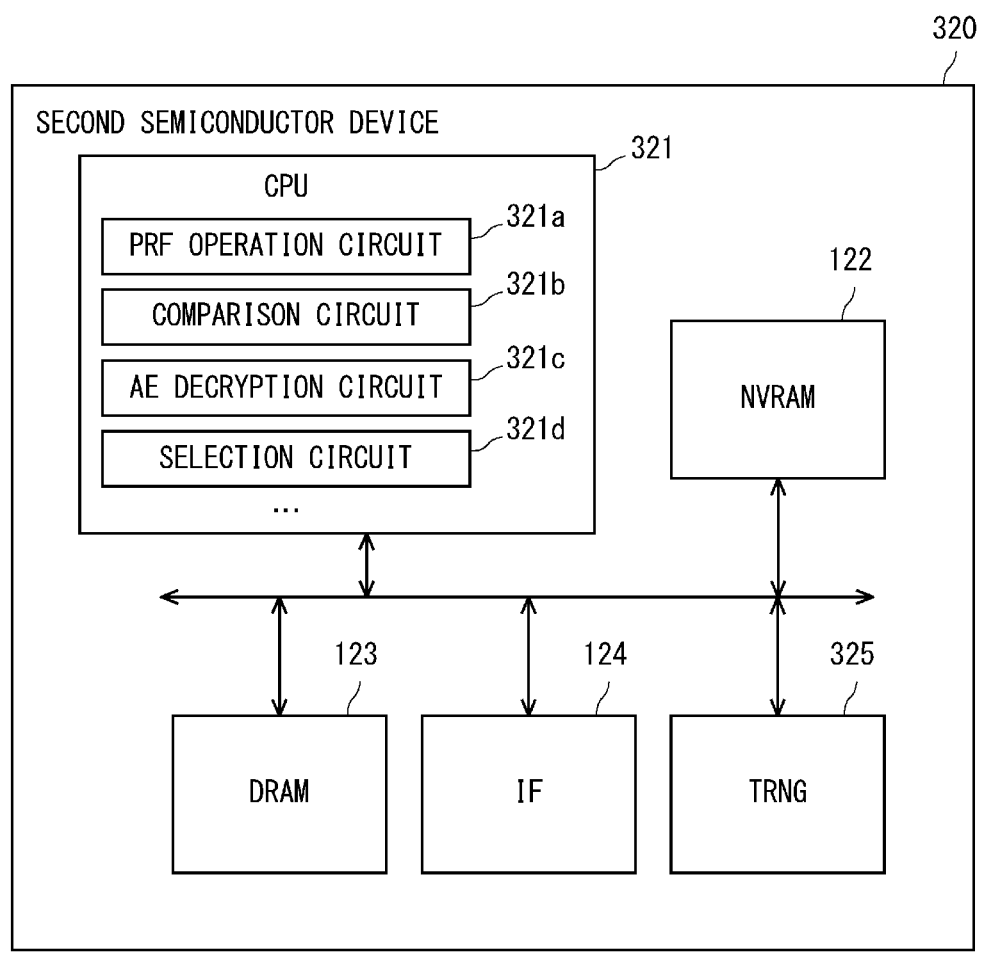
FIG. 17 is a hardware configuration diagram of a second semiconductor device according to a third embodiment.

FIG. 17 is a hardware configuration diagram of the second semiconductor device according to the third embodiment. In the transmission/reception system 3, the configuration of a CPU 321 in a second semiconductor device 320 included in the relay device 32 and the terminal device is different from that of the CPU 121 according to the first embodiment. The CPU 321 mainly includes a PRF operation circuit 321a, a comparison circuit 321b, an AE decryption circuit 321c, and a selection circuit 321d. Further, the second semiconductor device 320 is different from that in the first embodiment in that the second semiconductor device 320 includes a TRNG 325.

Figure 18:
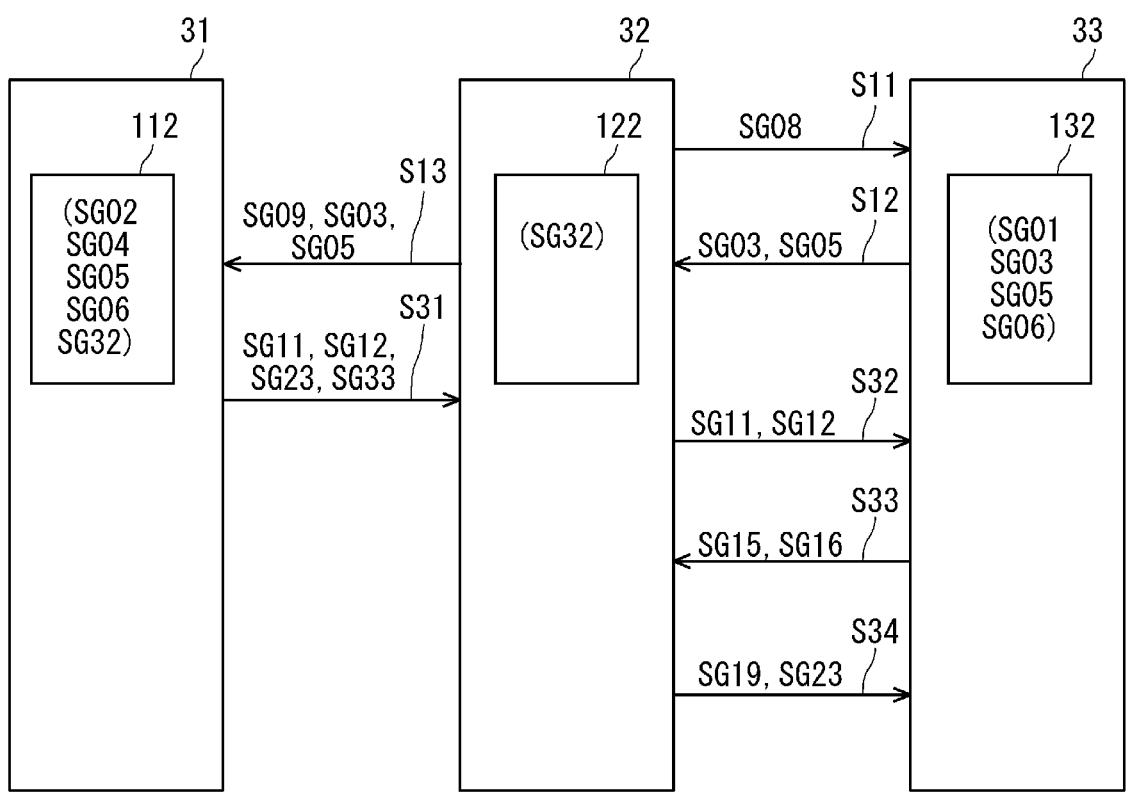
FIG. 18 is a diagram showing transmission/reception signals of a transmission/reception system according to the third embodiment.

Referring next to FIG. 18, signals that the respective devices in the transmission/reception system 3 include and signals transmitted or received by the respective devices will be described. FIG. 18 is a diagram showing transmission/reception signals of the transmission/reception system according to the third embodiment.

The transmission/reception system 3 shown in FIG. 18 is different from that in the first embodiment in that the NVRAM 112 of the server device 31 stores a common key SG32 and the NVRAM 122 of the relay device 32 stores the common key SG32. The data stored in the NVRAM 132 of the terminal device 33 is similar to that in the first embodiment.

In the following, signals that the respective devices according to the transmission/reception system 3 transmit or receive and processing that the respective devices perform that are different from those in the first embodiment will be described. As shown in FIG. 18, processing from Steps S11 to S13 in the transmission/reception system 3 is similar to that in the first embodiment.

Figure 19:
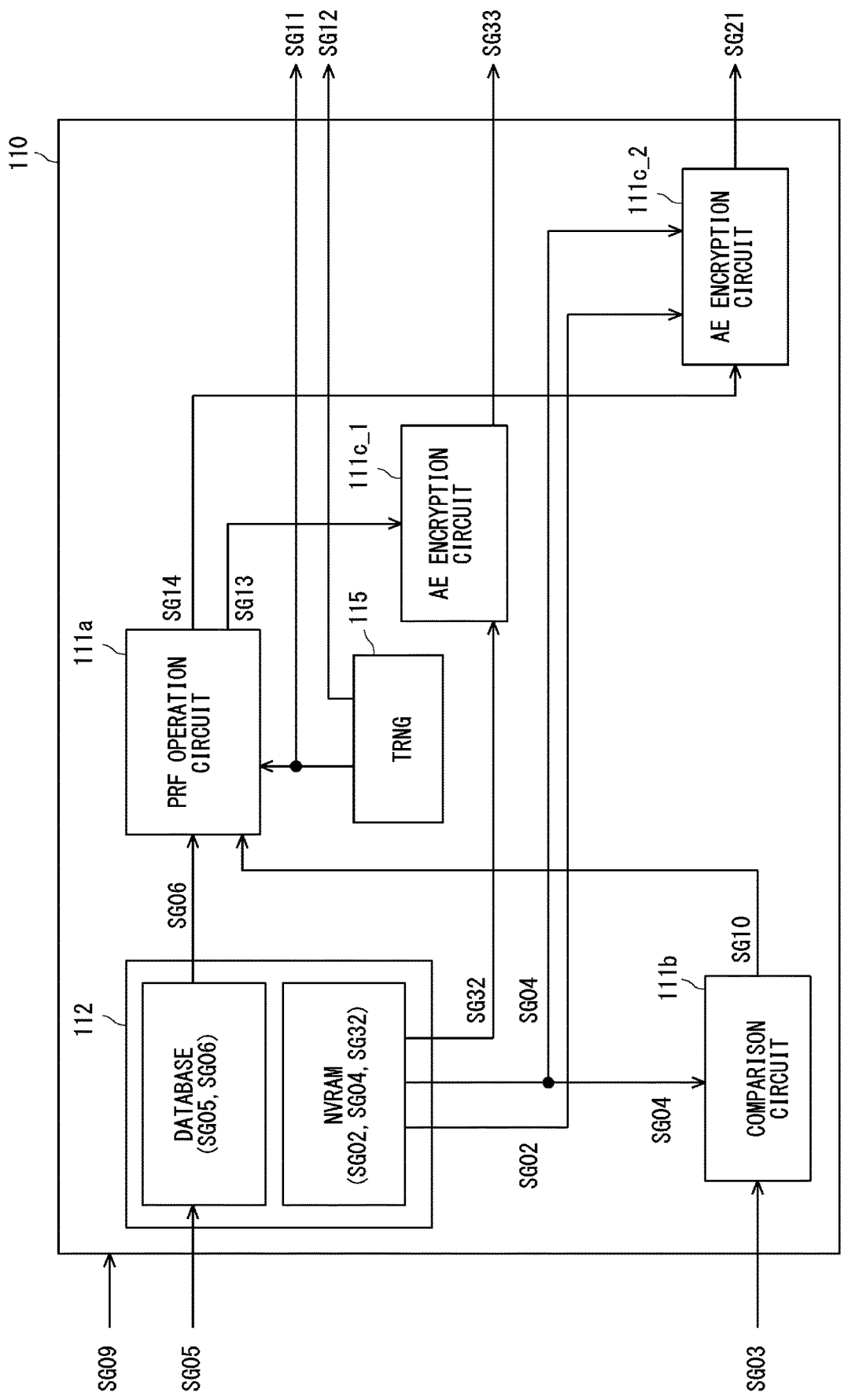
FIG. 19 is a functional block diagram of a first semiconductor device according to the third embodiment.

Referring next to FIG. 19, the processing performed by the server device 11 that is different from that in the first embodiment will be described. FIG. 19 is a functional block diagram of the server device according to the third embodiment. In FIG. 19, the first semiconductor device 110 of the server device 11 outputs a signal (the first random number signal SG11) for generating a key that is used when the encrypted update data is decrypted and a challenge code (the second random number signal SG12) for authenticating the terminal device 13. Since the processing until the first random number signal SG11 and the second random number signal SG12 are output is similar to that in the first embodiment, the descriptions thereof will be omitted.

The first semiconductor device 110 inputs the common key SG32 and the sixth random number signal SG13 into the AE encryption circuit 111c_1. The AE encryption circuit 111c_1 receives these signals, performs authenticated encryption processing on the received signal, and generates a ciphertext SG33.

Further, the first semiconductor device 110 inputs the update data SG02, the update version data SG04, and the seventh random number signal SG14 into an AE encryption circuit 111c_2. The AE encryption circuit 111c_2 receives these signals, performs authenticated encryption processing on the received signals, and generates encrypted update data SG21.

According to the above processing, the first semiconductor device 110 externally outputs the first random number signal SG11, the second random number signal SG12, the ciphertext SG33, and the encrypted update data SG21. Then the server device 11 transmits these signals to the relay device 32 (Step S31 in FIG. 18).

Figure 20:
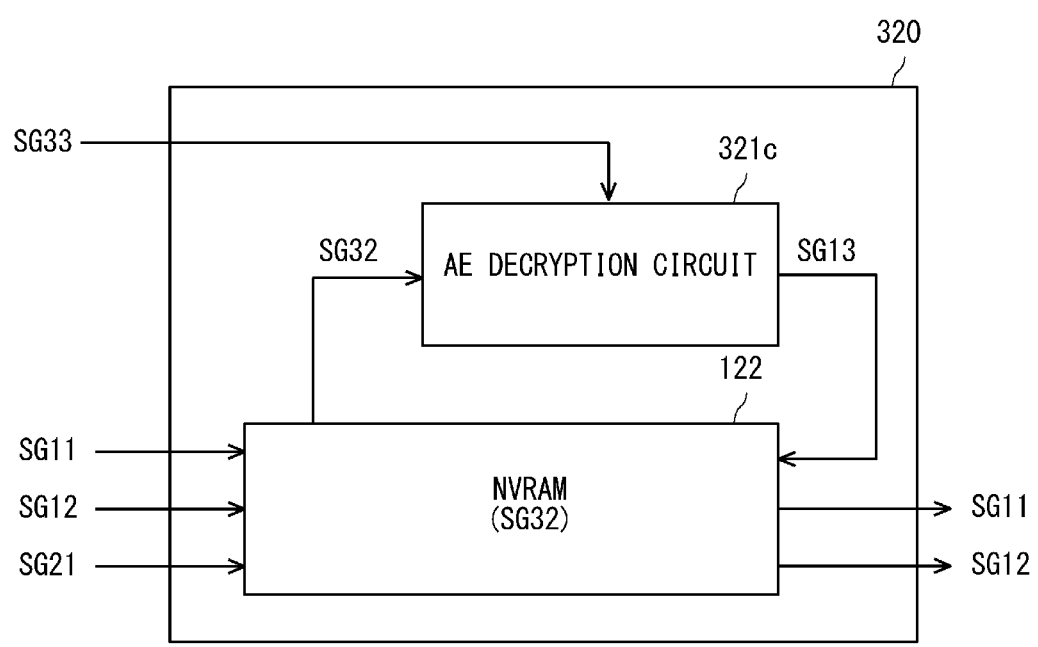
FIG. 20 is a functional block diagram of the second semiconductor device according to the third embodiment.

Referring next to FIG. 20, the processing performed by the relay device that has received the aforementioned signals will be described. FIG. 20 is a functional block diagram of the relay device according to the third embodiment. In FIG. 20, the second semiconductor device 320 of the relay device 32 performs the following processing.

First, the AE decryption circuit 321c receives the ciphertext SG33 as an input signal, and further receives the common key SG32 stored in the NVRAM 122 as an input signal. Then the AE decryption circuit 321c generates, by using these signals as the input signals, the sixth random number signal SG13 included in the ciphertext SG33 by decryption. The AE decryption circuit 321c causes the NVRAM 122 to store the generated sixth random number signal SG13.

Next, the second semiconductor device 320 causes the NVRAM 122 to store the first random number signal SG11, the second random number signal SG12, and the encrypted update data SG21, and performs processing of outputting the first random number signal SG11 and the second random number signal SG12 to the terminal device 33. The relay device 32 transmits these signals to the terminal device 33 (Step S32 in FIG. 18).

Next, the terminal device 33 processes the first random number signal SG11 and the second random number signal SG12 received from the relay device 32, and transmits the third random number signal SG15 and the ninth random number signal SG16 to the relay device 32 (Step S33 in FIG. 18). The processing in which the terminal device 33 processes the first random number signal SG11 and the second random number signal SG12 and the processing in which the terminal device 33 transmits the third random number signal SG15 and the ninth random number signal SG16 to the relay device 32 are similar to those described with reference to FIG. 7 in the first embodiment.

Figure 21:
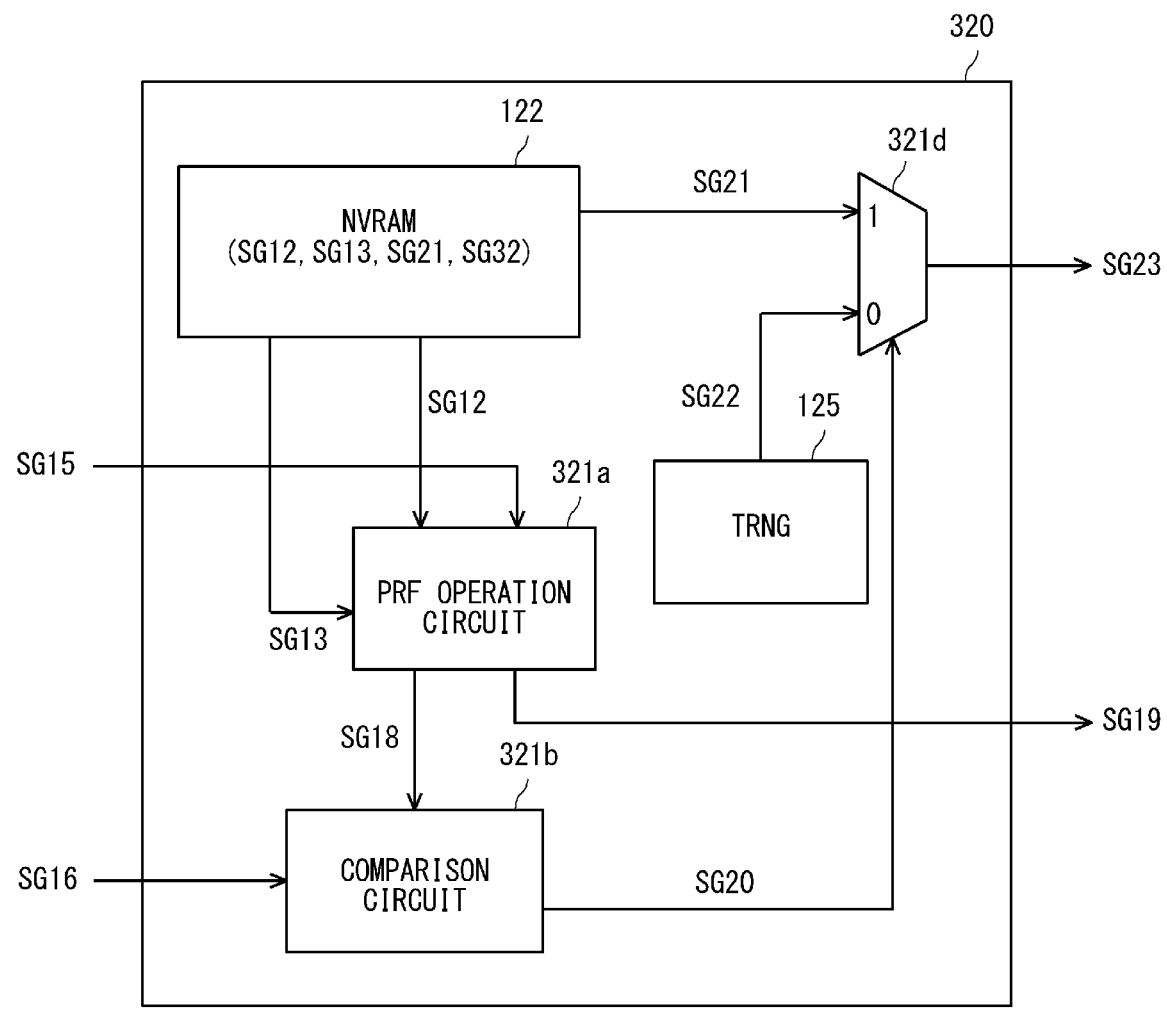
FIG. 21 is a functional block diagram of the second semiconductor device according to the third embodiment.

Referring next to FIG. 21, processing performed by the relay device 32 that has received the third random number signal SG15 and the ninth random number signal SG16 will be described. FIG. 21 is a functional block diagram of the relay device according to the third embodiment.

In the second semiconductor device 320, the PRF operation circuit 321a receives the third random number signal SG15 transmitted by the terminal device 33 as the input signal. Further, the PRF operation circuit 321a receives the sixth random number signal SG13 and the second random number signal SG12 stored in the NVRAM 122 as input signals. The PRF operation circuit 321a performs operational processing using these signals as input signals to generate the eighth random number signal SG18 and the eleventh random number signal SG19.

The second semiconductor device 320 outputs the eleventh random number signal SG19 generated by the PRF operation circuit 321a as a response code in response to the challenge code of the terminal device 33 (the third random number signal SG15).

The comparison circuit 321b receives each of the eighth random number signal SG18 generated by the PRF operation circuit 321a and the ninth random number signal SG16 received form the relay device 32 as a response code and compares these received signals.

When these signals do not coincide with each other as a result of comparison of data by the comparison circuit 321b, the comparison circuit 321b outputs "0" as the comparison result signal SG20. On the other hand, when these signals coincide with each other as a result of the comparison, the comparison circuit 321b outputs "1" as the comparison result signal SG20. The comparison circuit 321b supplies the output comparison result signal SG20 to the selection circuit 321d.

The TRNG 125 generates a fourth random number signal SG22 and inputs the generated signal into the selection circuit 321d. The fourth random number signal SG22 output from the TRNG 125 is a true random number whose number of digits of the signal is the same as that of the encrypted update data SG21.

The selection circuit 321d receives the encrypted update data SG21 and the fourth random number signal SG22 stored in the NVRAM 122 as input signals and receives the comparison result signal SG20 as a selection control signal. The selection circuit 321d selects, when the value of the comparison result signal SG20 is "1", the encrypted update data SG21 as the ciphertext SG23, which is an output signal. On the other hand, the selection circuit 321d selects, when the value of the comparison result signal SG20 is "0", the fourth random number signal SG22 in place of the encrypted update data SG21 as the ciphertext SG23, which is the output signal. The selection circuit 321d selects the signal in the way stated above and outputs the selected signal as the ciphertext SG23.

The relay device 32 transmits the eleventh random number signal SG19 and the ciphertext SG23 output from the second semiconductor device 320 to the terminal device 33 (Step S34 in FIG. 18). The following processing in the terminal device 33 is similar to that described in the first embodiment with reference to FIG. 9.

The data that the relay device 32 and the terminal device 33 transmit or receive in Steps S11 and S12 in FIG. 18 is not confidential one. Therefore, the pre-update version data SG03 and the identifier SG05 in the terminal device 33 may be stored in the relay device 32 in advance.

According to the above configuration, the transmission/reception system 3 according to the third embodiment is able to separate the communication between the server device 31 and the relay device 32 from the communication between the relay device 32 and the terminal device 33 to perform data update processing. Even in a case in which the terminal device 33 is in a remote place or includes only a near-field communication function and in an environment in which the communication between the server device 31 and the relay device 32 cannot be performed, for example, the transmission/reception system 3 is able to provide the update data for the terminal device 33.

Note that the present disclosure is not limited to the aforementioned embodiments and may be changed as appropriate without departing from the spirit of the present disclosure.

For example, some or all of the embodiments disclosed above can be described as, but not limited to, the following supplementary notes.

(Supplementary Note 1)

A semiconductor device comprising a memory, a random number generation circuit, and a control circuit and providing update data for an external terminal device, wherein
the memory stores key information,
the random number generation circuit generates a first random number signal and a second random number signal,
the control circuit generates a sixth random number signal and a seventh random number signal from the first random number signal and the key information,
the control circuit generates encrypted update data from the update data using a seventh random number signal,
the control circuit generates the first random number signal and the second random number signal as request signals to be transmitted to the external terminal device,
the control circuit receives a first response signal and a second response signal from the external terminal device as response signals in response to the request signals,
the control circuit generates an eighth random number signal using the first response signal, the second random number signal, and the sixth random number signal as input signals, and
the control circuit provides the encrypted update data for the external terminal device when the second response signal coincides with the eighth random number signal.

(Supplementary Note 2)

The semiconductor device according to Supplementary Note 1, wherein the control circuit calculates each of the sixth random number signal, the seventh random number signal, and the eighth random number signal by inputting them into one predetermined pseudorandom function.

(Supplementary Note 3)

The semiconductor device according to Supplementary Note 1, wherein the control circuit provides, when the second response signal does not coincide with the eighth random number signal, a random number signal whose number of digits is the same as that of the encrypted update data for the external terminal device in place of the encrypted update data.

(Supplementary Note 4)

The semiconductor device according to Supplementary Note 1, wherein the control circuit determines, when the control circuit has received, from the external terminal device, a third response signal, which is a response signal in response to the encrypted update data that has been provided, whether the third response signal coincides with a tenth random number signal generated using the first response signal, the second random number signal, and the sixth random number signal as input signals, registers that data has been updated when they coincide with each other, and registers that the data has not been updated when they do not coincide with each other.

(Supplementary Note 5)

A semiconductor device comprising a memory and a control circuit and receiving encrypted update data from an external server device, wherein
the memory stores pre-update data and key information,
the control circuit receives, from the external server device, a first random number signal and a second random number signal as request signals,
the control circuit generates a sixth random number signal and a seventh random number signal from the first random number signal and the key information,
the control circuit generates a ninth random number signal and a tenth random number signal using the second random number signal and the sixth random number signal as input signals,
the control circuit generates a challenge code including a predetermined signal,
the control circuit outputs the ninth random number signal and the challenge code to the external server device as response signals in response to the request signals,
the control circuit receives, from the external server device, an authentication signal and the encrypted update data based on the output response signal, and
the control circuit performs, when the received authentication signal coincides with the tenth random number signal, processing of decryption the encrypted update data received from the external server device.

(Supplementary Note 6)

The semiconductor device according to Supplementary Note 5, wherein the control circuit calculates each of the sixth random number signal, the seventh random number signal, the ninth random number signal, and the tenth random number signal by inputting them into one predetermined pseudorandom function.

(Supplementary Note 7)

The semiconductor device according to Supplementary Note 5, wherein the control circuit does not perform, when the received authentication signal does not coincide with the tenth random number signal, processing of decryption the encrypted update data received from the external server device.

(Supplementary Note 8)

The semiconductor device according to Supplementary Note 5, wherein the control circuit generates the challenge code by sequentially incrementing the numerical value of a predetermined number of digits.

(Supplementary Note 9)

The semiconductor device according to Supplementary Note 5, wherein the control circuit generates a twelfth random number signal using the second random number signal and the sixth random number signal as input signals, thereby generating the challenge code.

(Supplementary Note 10)

The semiconductor device according to Supplementary Note 5, further comprising a random number generation circuit that generates a third random number signal, wherein the control circuit receives, when it generates the ninth random number signal and the tenth random number signal, the third random number signal in addition to the second random number signal and the sixth random number signal as input signals, and the control circuit outputs a third random number signal to the external server device as the challenge code.

(Supplementary Note 11)

The semiconductor device according to Supplementary Note 5, wherein the control circuit generates a thirteenth random number signal as an output of a pseudorandom function at least including the second random number signal and the sixth random number signal as input signals, and the control circuit outputs the thirteenth random number signal to the external server device when the processing of decryption the encrypted update data has been successfully performed.

(Supplementary Note 12)

The semiconductor device according to Supplementary Note 11, wherein the control circuit outputs a random number signal to the external server device in place of the thirteenth random number signal when the processing of decryption the encrypted update data has not been successfully performed.

(Supplementary Note 13)

The semiconductor device according to Supplementary Note 12, further comprising a true random number generation circuit, wherein the random number signal is a true random number signal.

(Supplementary Note 14)

A method for providing update data for an external terminal device, the method comprising:

storing key information;

generating a first random number signal and a second random number signal, generating a sixth random number signal and a seventh random number signal from the first random number signal and the key information;

generating encrypted update data from the update data using a seventh random number signal;

generating the first random number signal and the second random number signal as request signals to be transmitted to the external terminal device;

receiving a first response signal and a second response signal from the external terminal device as response signals in response to the request signals;

generating an eighth random number signal using the first response signal, the second random number signal, and the sixth random number signal as input signals; and providing the encrypted update data for the external terminal device when the second response signal coincides with the eighth random number signal.

(Supplementary Note 15)

A method of receiving encrypted update data from an external server device, the method comprising:

storing pre-update data and key information;

receiving, from the external server device, a first random number signal and a second random number signal as request signals;

generating a sixth random number signal and a seventh random number signal from the first random number signal and the key information;

generating a ninth random number signal and a tenth random number signal using the second random number signal and the sixth random number signal as input signals;

generating a challenge code including a predetermined signal;

outputting the ninth random number signal and the challenge code to the external server device as response signals in response to the request signals;

receiving, from the external server device, an authentication signal and the encrypted update data based on the output response signal; and performing, when the received authentication signal coincides with the tenth random number signal, processing of decryption the encrypted update data received from the external server device.

(Supplementary Note 16)

A program for causing a computer to execute the following methods, the method being for providing update data for an external terminal device and comprising:

storing key information;

generating a first random number signal and a second random number signal;

generating a sixth random number signal and a seventh random number signal from the first random number signal and the key information;

generating encrypted update data from the update data using the seventh random number signal;

generating the first random number signal and the second random number signal as request signals to be transmitted to the external terminal device;

receiving a first response signal and a second response signal from the external terminal device as response signals in response to the request signals;

generating an eighth random number signal using the first response signal, the second random number signal, and the sixth random number signal as input signals; and providing the encrypted update data for the external terminal device when the second response signal coincides with the eighth random number signal.

(Supplementary Note 17)
A program for causing a computer to execute the following method, the method being for receiving encrypted update data from an external server device and comprising:
storing pre-update data and key information;
receiving, from the external server device, a first random number signal and a second random number signal as request signals;
generating a sixth random number signal and a seventh random number signal from the first random number signal and the key information;
generating a ninth random number signal and a tenth random number signal using the second random number signal and the sixth random number signal as input signals;
generating a challenge code including a predetermined signal;
outputting the ninth random number signal and the challenge code to the external server device as response signals in response to the request signals;
receiving, from the external server device, an authentication signal and the encrypted update data based on the output response signal; and
performing, when the received authentication signal coincides with the tenth random number signal, processing of decrypting the encrypted update data received from the external server device.

(Supplementary Note 18)
A semiconductor device comprising a memory, a random number generation circuit, and a control circuit, receiving encrypted update data from an external server device, and providing the received encrypted update data for an external terminal device, wherein
the memory stores a common key that is available between the memory and the external server device,
the control circuit receives, from the external server device, encryption key data including a first random number signal, a second random number signal, and a sixth random number signal encrypted by the common key, and encrypted update data,
the control circuit decrypts the encryption key data by the common key to generate a sixth random number signal,
the control circuit outputs the first random number signal and the second random number signal as request signals to be transmitted to the external terminal device;
the control circuit receives a first response signal and a second response signal from the external terminal device as response signals in response to the request signals,
the control circuit generates an eighth random number signal using the first response signal, the second random number signal, and the sixth random number signal as input signals, and
the control circuit provides the encrypted update data for the external terminal device when the second response signal coincides with the eighth random number signal.

(Supplementary Note 19)
The semiconductor device according to Supplementary Note 18, wherein each of the sixth random number signal and the eighth random number signal is calculated by inputting them into one predetermined pseudorandom function.

(Supplementary Note 20)
The semiconductor device according to Supplementary Note 18, wherein the control circuit provides, when the second response signal does not coincide with the eighth random number signal, a random number signal whose number of digits is the same as that of the encrypted update data for the external terminal device in place of the encrypted update data.

(Supplementary Note 21)
A transmission/reception system comprising a server device and a terminal device that receives update data from the server device, wherein
each of the server device and the terminal device stores master key information in advance,
the server device transmits a first random number signal and a first challenge code for authenticating the terminal device to the terminal device,
the terminal device transmits a first response code generated based on the first random number signal and the first challenge code and a second challenge code for authenticating a server device to the server device,
the server device transmits, when the first response code coincides with an expected value, encrypted update data encrypted by the master key and a second response code for the second challenge code to the terminal device, and
the terminal device decrypts the encrypted update data received using the master key when the second response code coincides with an expected value.

(Supplementary Note 22)
The transmission/reception system according to Supplementary Note 21, wherein
each of the server device and the terminal device stores a common pseudorandom function,
the terminal device outputs the first challenge code to the pseudorandom function to generate the first response code, and
the server device outputs the second challenge code to the pseudorandom function to generate the second response code.

(Supplementary Note 23)
The transmission/reception system according to Supplementary Note 21, wherein
the server device includes a true random number generation circuit, and
each of the first random number signal and the first challenge code is a true random number signal.

(Supplementary Note 24)
The transmission/reception system according to Supplementary Note 23, wherein
the terminal device includes a true random number generation circuit, and
the second challenge code is a true random number signal.

(Supplementary Note 25)
The transmission/reception system according to Supplementary Note 21, wherein
the terminal device transmits, when registration of update data has been completed based on the encrypted update data that it has received, an update result signal generated based on the first random number signal and the first challenge code to the server device, and
the server device registers, when the update result signal received from the terminal device coincides with an expected value, that the data of the terminal device is the update data or registers, when the update result signal does not coincide with the expected value, that the data of the terminal device is not the update data.

(Supplementary Note 26)
The transmission/reception system according to Supplementary Note 21, wherein the server device transmits, when the first challenge code does not coincide with an expected value, a random number signal whose number of digits is the same as that of the encrypted update data in place of the encrypted update data.

(Supplementary Note 27)

The transmission/reception system according to Supplementary Note 21, wherein the terminal device does not decrypt the encrypted update data that it has received when the response code does not coincide with an expected value.

(Supplementary Note 28)

The transmission/reception system according to Supplementary Note 21, further comprising a relay device configured to relay communication between the server device and the terminal device, wherein the relay device transmits a signal for requesting version information of pre-update data to the terminal device and transmits the version information received from the terminal device and a signal for requesting processing for updating the pre-update data to the server device.

(Supplementary Note 29)

The transmission/reception system according to Supplementary Note 21, further comprising a relay device configured to relay communication between the server device and the terminal device, wherein each of the server device and the relay device stores a common key in advance, the server device transmits encryption key data including a first random number signal, the first challenge code, and a sixth random number signal encrypted by the common key, and the encrypted update data to the relay device, the relay device transmits the first random number signal and a first challenge code to the terminal device, the terminal device transmits the first random number signal, the first response code, and the second challenge code to the relay device, the relay device transmits, when the first response code coincides with an expected value, the encrypted update data and the second response code to the terminal device, and the terminal device decrypts, when the second response code coincides with an expected value, the encrypted update data that it has received.

INDUSTRIAL APPLICABILITY

One embodiment is applicable to a server device, a terminal device and the like that send and receive an update program.

REFERENCE SIGNS LIST 1, 2, 3 Transmission/reception System
11, 21, 31 Server Device
12, 22, 32 Relay Device
13, 23, 33 Terminal Device
110, 210 First Semiconductor Device
120, 320 Second Semiconductor Device
130, 230 Third Semiconductor Device
900 Network
SG01 Pre-update Data
SG02 Update Data
SG03 Pre-update Version Data
SG04 Update Version Data
SG05 Identifier
SG06 Master Key
SG07 Twelfth Random Number Signal
SG08 Version Check Request Signal
SG09 Version Upgrade Request Signal
SG10 Comparison Result Signal
SG11 First Random Number Signal
SG12 Second Random Number Signal
SG13 Sixth Random Number Signal
SG14 Seventh Random Number Signal
SG15 Third Random Number Signal
SG16 Ninth Random Number Signal
SG17 Tenth Random Number Signal
SG18 Eighth Random Number Signal
SG19 Eleventh Random Number Signal
SG20 Comparison Result Signal
SG21 Encrypted Update Data
SG22 Fourth Random Number Signal
SG23 Ciphertext
SG24 Comparison Result Signal
SG25 Comparison Result Signal
SG26 Thirteenth Random Number Signal
SG27 Fourteenth Random Number Signal
SG28 First Update Result Signal
SG29 Fifth Random Number Signal
SG30 Second Update Result Signal
SG31 Comparison Result Signal
SG32 Common Key
SG33 Ciphertext

The invention claimed is:

1. A semiconductor device comprising a memory, a random number generation circuit, and a control circuit and providing update data for an external terminal device, wherein the memory stores key information, the random number generation circuit generates a first random number signal and a second random number signal, the control circuit generates a sixth random number signal and a seventh random number signal from the first random number signal and the key information, the control circuit generates encrypted update data from the update data using the seventh random number signal, the control circuit generates the first random number signal and the second random number signal as request signals to be transmitted to the external terminal device, the control circuit receives a first response signal and a second response signal from the external terminal device as response signals in response to the request signals, the control circuit generates an eighth random number signal using the first response signal, the second random number signal, and the sixth random number signal, and the control circuit provides the encrypted update data for the external terminal device when the second response signal coincides with the eighth random number signal.

2. The semiconductor device according to claim 1, wherein the control circuit calculates each of the sixth random number signal, the seventh random number signal, and the eighth random number signal by inputting them into one predetermined pseudorandom function.

3. The semiconductor device according to claim 1, wherein the control circuit provides, when the second response signal does not coincide with the eighth random number signal, a random number signal whose number of digits is the same as that of the encrypted update data for the external terminal device in place of the encrypted update data.

4. The semiconductor device according to claim 1, wherein the control circuit determines, when the control circuit has received, from the external terminal device, a third response signal, which is a response signal in response to the encrypted update data that has been provided, whether the third response signal coincides with a tenth random number signal generated using the first response signal, the second random number signal, and the sixth random number signal, registers that data has been updated when they coincide with each other, and registers that the data has not been updated when they do not coincide with each other.

5. A semiconductor device comprising a memory and a control circuit and receiving encrypted update data from an external server device, wherein
the memory stores pre-update data and key information,
the control circuit receives, from the external server device, a first random number signal and a second random number signal as request signals,
the control circuit generates a sixth random number signal and a seventh random number signal from the first random number signal and the key information,
the control circuit generates a ninth random number signal and a tenth random number signal using the second random number signal and the sixth random number signal,
the control circuit generates a challenge code including a predetermined signal,
the control circuit outputs the ninth random number signal and the challenge code to the external server device as response signals in response to the request signals,
the control circuit receives, from the external server device, an authentication signal and the encrypted update data that respond to the response signals, and
the control circuit performs, when the received authentication signal coincides with the tenth random number signal, processing of decrypting the encrypted update data received from the external server device.

6. The semiconductor device according to claim 5, wherein the control circuit calculates each of the sixth random number signal, the seventh random number signal, the ninth random number signal, and the tenth random number signal by inputting them into one predetermined pseudorandom function.

7. The semiconductor device according to claim 5, wherein the control circuit does not perform, when the received authentication signal does not coincide with the tenth random number signal, processing of decrypting the encrypted update data received from the external server device.

8. The semiconductor device according to claim 5, wherein the control circuit generates the challenge code by sequentially incrementing the numerical value of a predetermined number of digits.

9. The semiconductor device according to claim 5, wherein the control circuit generates a twelfth random number signal using the second random number signal and the sixth random number signal, thereby generating the challenge code.

10. The semiconductor device according to claim 5, further comprising a random number generation circuit that generates a third random number signal, wherein
the control circuit receives, when it generates the ninth random number signal and the tenth random number signal, the third random number signal in addition to the second random number signal and the sixth random number signal, and
the control circuit outputs the third random number signal to the external server device as the challenge code.

11. The semiconductor device according to claim 5, wherein the control circuit generates a thirteenth random number signal as an output of a pseudorandom function at least including the second random number signal and the sixth random number signal, and
the control circuit outputs the thirteenth random number signal to the external server device when the processing of decrypting the encrypted update data has been successfully performed.

12. The semiconductor device according to claim 11, wherein the control circuit outputs a random number signal to the external server device in place of the thirteenth random number signal when the processing of decrypting the encrypted update data has not been successfully performed.

13. The semiconductor device according to claim 12, further comprising a true random number generation circuit, wherein the random number signal is a true random number signal.

14. A method for providing update data for an external terminal device, the method comprising:
storing key information;
generating a first random number signal and a second random number signal;
generating a sixth random number signal and a seventh random number signal from the first random number signal and the key information;
generating encrypted update data from the update data using the seventh random number signal;
generating the first random number signal and the second random number signal as request signals to be transmitted to the external terminal device;
receiving a first response signal and a second response signal from the external terminal device as response signals in response to the request signals;
generating an eighth random number signal using the first response signal, the second random number signal, and the sixth random number signal; and
providing the encrypted update data for the external terminal device in response to determining that the second response signal coincides with the eighth random number signal.

15. A method of receiving encrypted update data from an external server device, the method comprising:
storing pre-update data and key information;
receiving, from the external server device, a first random number signal and a second random number signal as request signals;
generating a sixth random number signal and a seventh random number signal from the first random number signal and the key information;
generating a ninth random number signal and a tenth random number signal using the second random number signal and the sixth random number signal;
generating a challenge code including a predetermined signal;
outputting the ninth random number signal and the challenge code to the external server device as response signals in response to the request signals;
receiving, from the external server device, an authentication signal and the encrypted update data that respond to the response signals; and
performing, in response to determining that the received authentication signal coincides with the tenth random number signal, processing of decrypting the encrypted update data received from the external server device.

16. A non-transitory computer readable medium storing a program for causing a computer to execute the following methods, the method being one for providing update data for an external terminal device and comprising:
    storing key information;
    generating a first random number signal and a second random number signal;
    generating a sixth random number signal and a seventh random number signal from the first random number signal and the key information;
    generating encrypted update data from the update data using the seventh random number signal;
    generating the first random number signal and the second random number signal as request signals to be transmitted to the external terminal device;
    receiving a first response signal and a second response signal from the external terminal device as response signals in response to the request signals;
    generating an eighth random number signal using the first response signal, the second random number signal, and the sixth random number signal; and
    providing the encrypted update data for the external terminal device in response to determining that the second response signal coincides with the eighth random number signal.

17. A non-transitory computer readable medium storing a program for causing a computer to execute the following method, the method being for receiving encrypted update data from an external server device and comprising:
    storing pre-update data and key information;
    receiving, from the external server device, a first random number signal and a second random number signal as request signals;
    generating a sixth random number signal and a seventh random number signal from the first random number signal and the key information;
    generating a ninth random number signal and a tenth random number signal using the second random number signal and the sixth random number signal;
    generating a challenge code including a predetermined signal;
    outputting the ninth random number signal and the challenge code to the external server device as response signals in response to the request signals;
    receiving, from the external server device, an authentication signal and the encrypted update data that respond to the response signals; and
    performing, in response to determining that the received authentication signal coincides with the tenth random number signal, processing of decrypting the encrypted update data received from the external server device.

18. A semiconductor device comprising a memory, a random number generation circuit, and a control circuit, receiving encrypted update data from an external server device, and providing the received encrypted update data for an external terminal device, wherein
    the memory stores a common key that is available between the memory and the external server device;
    the control circuit receives, from the external server device, encryption key data including a first random number signal, a second random number signal, and a sixth random number signal encrypted by the common key, and encrypted update data;
    the control circuit decrypts the encryption key data by the common key to generate the sixth random number signal;
    the control circuit outputs the first random number signal and the second random number signal as request signals to be transmitted to the external terminal device;
    the control circuit receives a first response signal and a second response signal from the external terminal device as response signals in response to the request signals;
    the control circuit generates an eighth random number signal using the first response signal, the second random number signal, and the sixth random number signal; and
    the control circuit provides the encrypted update data for the external terminal device when the second response signal coincides with the eighth random number signal.

19. The semiconductor device according to claim 18, wherein each of the sixth random number signal and the eighth random number signal is calculated by inputting them into one predetermined pseudorandom function.

20. The semiconductor device according to claim 18, wherein the control circuit provides, when the second response signal does not coincide with the eighth random number signal, a random number signal whose number of digits is the same as that of the encrypted update data for the external terminal device in place of the encrypted update data.

* * * * *